US012592809B2

(12) United States Patent
Park et al.

(10) Patent No.: US 12,592,809 B2
(45) Date of Patent: Mar. 31, 2026

(54) METHOD FOR PERFORMING MT OPERATION AND DU OPERATION BY IAB NODE IN WIRELESS COMMUNICATION SYSTEM, AND DEVICE THEREFOR

(71) Applicant: LG ELECTRONICS INC., Seoul (KR)

(72) Inventors: Haewook Park, Seoul (KR); Byounghoon Kim, Seoul (KR); Joonkui Ahn, Seoul (KR); Hyangsun You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 424 days.

(21) Appl. No.: 17/909,546

(22) PCT Filed: Mar. 5, 2021

(86) PCT No.: PCT/KR2021/002738
§ 371 (c)(1),
(2) Date: Sep. 6, 2022

(87) PCT Pub. No.: WO2021/177775
PCT Pub. Date: Sep. 10, 2021

(65) Prior Publication Data
US 2023/0117298 A1     Apr. 20, 2023

(30) Foreign Application Priority Data
Mar. 5, 2020     (KR) ........................ 10-2020-0027802

(51) Int. Cl.
*H04L 5/14*          (2006.01)
*H04W 72/044*     (2023.01)

(52) U.S. Cl.
CPC ............. *H04L 5/14* (2013.01); *H04W 72/044* (2013.01)

(58) Field of Classification Search
CPC ................................ H04L 5/14; H04W 72/044
See application file for complete search history.

(56) References Cited

U.S. PATENT DOCUMENTS

2019/0350023 A1    11/2019  Novlan et al.
2020/0170010 A1*   5/2020  Luo ........................... H04L 5/26
(Continued)

FOREIGN PATENT DOCUMENTS

WO          2019194737          10/2019

OTHER PUBLICATIONS

AT&T, "Summary #3 of 7.2.3.1—Mechanisms for resource multiplexing among backhaul and access links," 3GPP TSG-RAN WG1 Meeting #99, R1-1913503, Nov. 2019, 19 pages.
CMCC, "Remaining issues on resource multiplexing among backhaul and access links," 3GPP TSG-RAN WG1 Meeting #100-e, e-Meeting, R1-2000745, Feb. 2020, 5 pages.
ZTE, Sanechips, "Remaining issues in IAB resource multiplexing," 3GPP TSG-RAN WG1 Meeting #100-e, e-Meeting, R1-2000400, Feb. 2020, 5 pages.
(Continued)

*Primary Examiner* — Won Tae C Kim
(74) *Attorney, Agent, or Firm* — LEE, HONG, DEGERMAN, KANG & WAIMEY

(57)          ABSTRACT
According to various embodiments, disclosed are a method and a device for performing a mobile terminal (MT) operation and a distributed unit (DU) operation by an IAB node in a wireless communication system in which frequency division duplex (FDD) is supported. Disclosed are the method and the device for the method, the method comprising the steps of: receiving first resource configuration information relating to the MT operation and second resource configuration information relating to the DU operation; and performing the MT operation on the basis of the first resource configuration information and performing the DU operation on the basis of the second resource configuration information, wherein, on the basis that there is no report on a multiplexing capability between the MT operation and the DU operation, the first resource configuration information and the second resource configuration information: support
(Continued)

Receiving first resource configuration information for MT operation — S201

Receiving second resource configuration information for DU operation — S203

Performing MT and DU operations based on the first resource configuration information and the second resource configuration information — S205 simultaneously performing an MT reception operation and a DU reception operation and simultaneously performing an MT transmission operation and a DU transmission operation; and prohibit to support simultaneously performing the MT transmission operation and the DU reception operation and simultaneously performing the MT reception operation and the DU transmission operation.

7 Claims, 20 Drawing Sheets

(56)                References Cited

U.S. PATENT DOCUMENTS

| | | | |
|---|---|---|---|
| 2021/0250941 A1* | 8/2021 | Tiirola | H04W 40/22 |
| 2022/0263635 A1* | 8/2022 | Li | H04L 5/0051 |
| 2023/0036240 A1* | 2/2023 | You | H04W 84/04 |
| 2023/0164747 A1* | 5/2023 | You | H04W 74/0833 |
| | | | 370/329 |

OTHER PUBLICATIONS

PCT International Application No. PCT/KR2021/002738, Written Opinion of the International Searching Authority dated Jun. 22, 2021, 3 pages.

\* cited by examiner

--------- : Backhaul(BH) link
———— : Access(AC) link

Receiving first resource configuration information for MT operation — S201

Receiving second resource configuration information for DU operation — S203

Performing MT and DU operations based on the first resource configuration information and the second resource configuration information — S205

Device(100, 200)

METHOD FOR PERFORMING MT OPERATION AND DU OPERATION BY IAB NODE IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2021/002738, filed on Mar. 5, 2021, which claims the benefit of earlier filing date and right of priority to Korean Application No. 10-2020-0027802, filed on Mar. 5, 2020, the contents of which are all incorporated by reference herein in their entirety.

TECHNICAL FIELD

The present disclosure relates to a method of performing an MT operation and a DU operation by an IAB node in an FDD-supported wireless communication system.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

One potential technology that aims to enable future cellular network deployment scenarios and applications is support for wireless backhaul and relay links. Wireless backhaul and relay links enable flexible and highly dense deployment of NR cells without the need to proportionally densify the transport network.

Since greater bandwidth in NR is expected to be available (e.g., mmWave spectrum) compared to LTE with native deployment of a massive MIMO or multi-beam system, opportunities for development and deployment of integrated access and backhaul link are created. This allows easier deployment of a dense network of self-backhauled NR cells in a more integrated manner by establishing multiple control and data channels/procedures defined to provide connection or access to user equipments. Such a system is referred to as Integrated Access and Backhaul links (IAB).

DETAILED DESCRIPTION OF DISCLOSURE

Technical Task

One technical task of the present disclosure is to provide a method and apparatus for minimizing inefficiency of an IAB behavior while minimizing the waste of FDDed radio resources by defining a simultaneous operation between some operations among transmission/reception direction combinations between a DU operation and an MT operation at an IAB node supportive of paired spectrum (or FDD) as a default operation.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solutions

In one technical aspect of the present disclosure, provided is a method of performing a Mobile Terminal (MT) operation and a Distributed Unit (DU) operation by an Integrated Access and Backhaul (IAB) node in a Frequency Division Duplex (FDD) supported wireless communication system, the method including receiving a first resource configuration information on the MT operation and a second resource configuration information on the DU operation and performing the MT operation based on the first resource configuration information and the DU operation based on the second resource configuration information, wherein based on no report of a multiplexing capability between the MT operation and the DU operation, the first resource configuration information and the second resource configuration information may support simultaneous performance of an MT reception operation and a DU reception operation and simultaneous performance of an MT transmission operation and a DU transmission operation but may not support simultaneous performance of the MT transmission operation and the DU reception operation and simultaneous performance of the MT reception operation and the DU transmission operation.

The multiplexing capability may be classified into a capability between the MT transmission operation and the DU reception operation, a capability between the MT reception operation and the DU transmission operation, a capability between the MT reception operation and the DU reception operation, and a capability between the MT transmission operation and the DU transmission operation.

The first resource configuration information may indicate a first available resource for the MT transmission operation in uplink and a second available resource for the MT reception operation in downlink and wherein the second resource configuration information may indicate a third available resource for the DU transmission operation in the downlink and a fourth available resource for the DU reception operation in the uplink.

The first available resource may be configured to be distinguished from the fourth available resource in a time domain and the third available resource in a frequency domain and the second available resource may be configured to be distinguished from the third available resource in the time domain and the fourth available resource in the frequency domain.

The first resource configuration information may be signaled by Radio Resource Control (RRC) and the second resource configuration information may be signaled via F1 Application Protocol (AP).

Each of the first resource configuration information and the second resource configuration information may include an indication information on an available resource, an unavailable resource, and a soft resource having availability not determined for each of a downlink and an uplink and availability indication for the soft resource may be indicated through an Availability Indicator (AI) included in a DCI.

The IAB node may ignore a value equal to or greater than a preconfigured threshold among values indicated by the AI when an approach manner between the downlink and the uplink is FDD.

When the downlink and the uplink are FDDed, the IAB node may ignore a value equal to or smaller than a preconfigured value among values indicated by the AI.

The AI may be configured differently depending on whether an approach manner between the downlink and the uplink is Time Division Duplex (TDD) or FDD.

In another technical aspect of the present disclosure, provided is a method of configuring a resource for an Integrated Access and Backhaul (IAB) node by a network in a Frequency Division Duplex (FDD) supported wireless communication system, the method including scheduling a first resource configuration information on a Mobile Terminal (MT) operation and a second resource configuration information on a Distributed Unit (DU) operation and transmitting the first resource configuration information and the DU operation to the IAB node, wherein based on no report of a multiplexing capability between the MT operation and the DU operation, the first resource configuration information and the second resource configuration information may be scheduled to support simultaneous performance of an MT reception operation and a DU reception operation and simultaneous performance of an MT transmission operation and a DU transmission operation and not to support simultaneous performance of the MT transmission operation and the DU reception operation and simultaneous performance of the MT reception operation and the DU transmission operation.

In another technical aspect of the present disclosure, provided is an Integrated Access and Backhaul (IAB) node performing a Mobile Terminal (MT) operation and a Distributed Unit (DU) operation in a Frequency Division Duplex (FDD) supported wireless communication system, the IAB node including a Radio Frequency (RF) transceiver and a processor connected to the RF transceiver, the processor controlling the RF transceiver to receive a first resource configuration information on the MT operation and a second resource configuration information on the DU operation, perform the MT operation based on the first resource configuration information, and perform the DU operation based on the second resource configuration information, wherein based on no report of a multiplexing capability between the MT operation and the DU operation, the first resource configuration information and the second resource configuration information may support simultaneous performance of an MT reception operation and a DU reception operation and simultaneous performance of an MT transmission operation and a DU transmission operation but may not support simultaneous performance of the MT transmission operation and the DU reception operation and simultaneous performance of the MT reception operation and the DU transmission operation.

The multiplexing capability may be classified into a capability between the MT transmission operation and the DU reception operation, a capability between the MT reception operation and the DU transmission operation, a capability between the MT reception operation and the DU reception operation, and a capability between the MT transmission operation and the DU transmission operation.

In another technical aspect of the present disclosure, provided is a network configuring a resource for an Integrated Access and Backhaul (IAB) node in a Frequency Division Duplex (FDD) supported wireless communication system, the network including a Radio Frequency (RF) transceiver and a processor connected to the RF transceiver, the processor controlling the RF transceiver to schedule a first resource configuration information on a Mobile Terminal (MT) operation and a second resource configuration information on a Distributed Unit (DU) operation and transmit the first resource configuration information and the second resource configuration information, wherein based on no report of a multiplexing capability between the MT operation and the DU operation, the first resource configuration information and the second resource configuration information may be scheduled to support simultaneous performance of an MT reception operation and a DU reception operation and simultaneous performance of an MT transmission operation and a DU transmission operation and not to support simultaneous performance of the MT transmission operation and the DU reception operation and simultaneous performance of the MT reception operation and the DU transmission operation.

In further technical aspect of the present disclosure, provided is a chipset performing a Mobile Terminal (MT) operation and a Distributed Unit (DU) operation in a Frequency Division Duplex (FDD) supported wireless communication system, the chipset including at least one processor and at least one memory operably connected to the at least one processor and enabling the at least one processor to perform an operation when executed, the operation including receiving a first resource configuration information on the MT operation and a second resource configuration information on the DU operation, performing the MT operation based on the first resource configuration information, and performing the DU operation based on the second resource configuration information, wherein based on no report of a multiplexing capability between the MT operation and the DU operation, the first resource configuration information and the second resource configuration information may support simultaneous performance of an MT reception operation and a DU reception operation and simultaneous performance of an MT transmission operation and a DU transmission operation but may not support simultaneous performance of the MT transmission operation and the DU reception operation and simultaneous performance of the MT reception operation and the DU transmission operation.

In another further technical aspect of the present disclosure, provided is a computer-readable storage medium including at least one computer program enabling a Mobile Terminal (MT) operation and a Distributed Unit (DU) operation to be performed in a Frequency Division Duplex (FDD) supported wireless communication system, the computer-readable storage medium including at least one computer program enabling at least one processor to perform the MT operation and the DU operation and a computer-readable storage medium storing the at least one computer program therein, wherein the operation may include receiving a first resource configuration information on the MT operation and a second resource configuration information on the DU operation, performing the MT operation based on the first resource configuration information, and performing the DU operation based on the second resource configuration information and wherein based on no report of a multiplexing capability between the MT operation and the DU operation, the first resource configuration information and the second resource configuration information may support simultaneous performance of an MT reception operation and a DU reception operation and simultaneous performance of an MT transmission operation and a DU transmission operation but may not support simultaneous performance of the MT transmission operation and the DU reception operation and simultaneous performance of the MT reception operation and the DU transmission operation.

Advantageous Effects

Various embodiments may minimize inefficiency of an IAB behavior while minimizing the waste of FDDed radio resources by defining a simultaneous operation between some operations among transmission/reception direction combinations between a DU operation and an MT operation at an IAB node supportive of paired spectrum (or FDD) as a default operation Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE FOR DISCLOSURE

Figure 1:
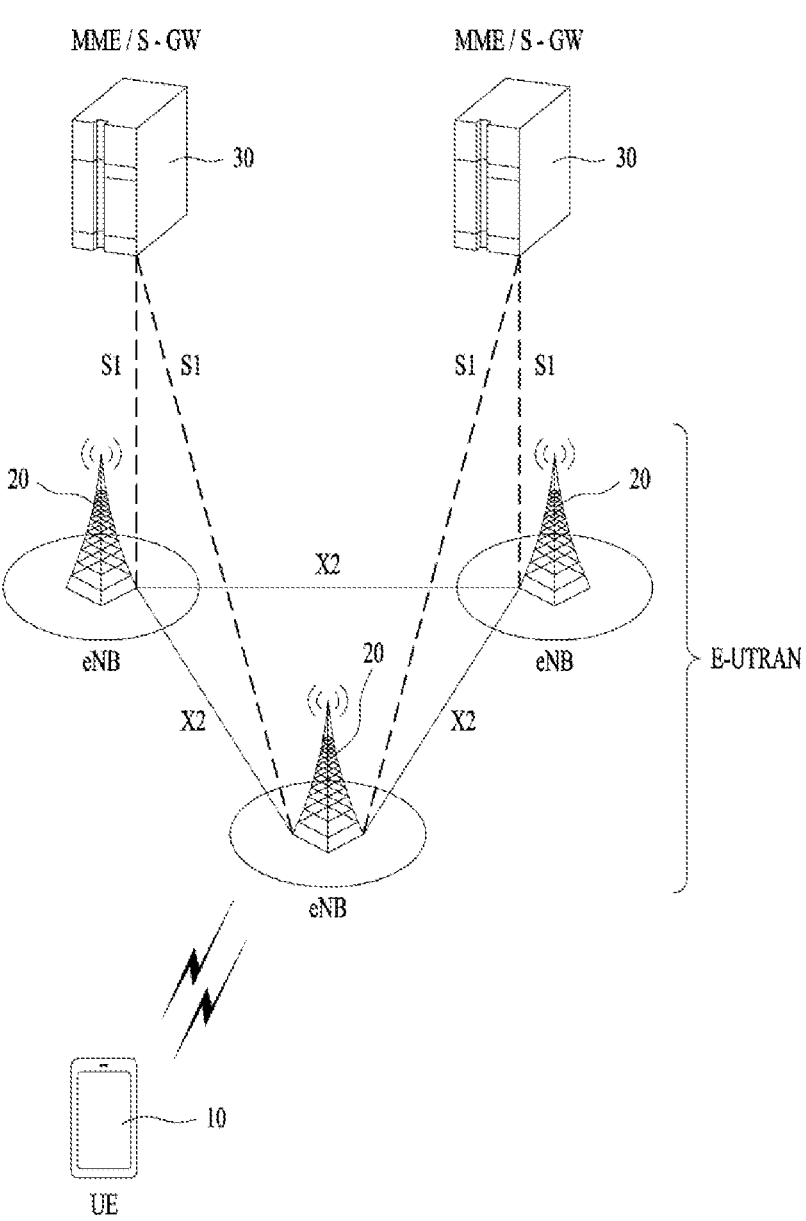
FIG. 1 illustrates the structure of an LTE system to which embodiment(s) are applicable.

The wireless communication system is a multiple access system that supports communication with multiple users by sharing available system resources (eg, bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto.

FIG. 1 illustrates the structure of an LTE system to which the present disclosure is applicable. This may also be called an evolved UMTS terrestrial radio access network (E-UTRAN) or LTE/LTE-A system.

Referring to FIG. 1, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 2:
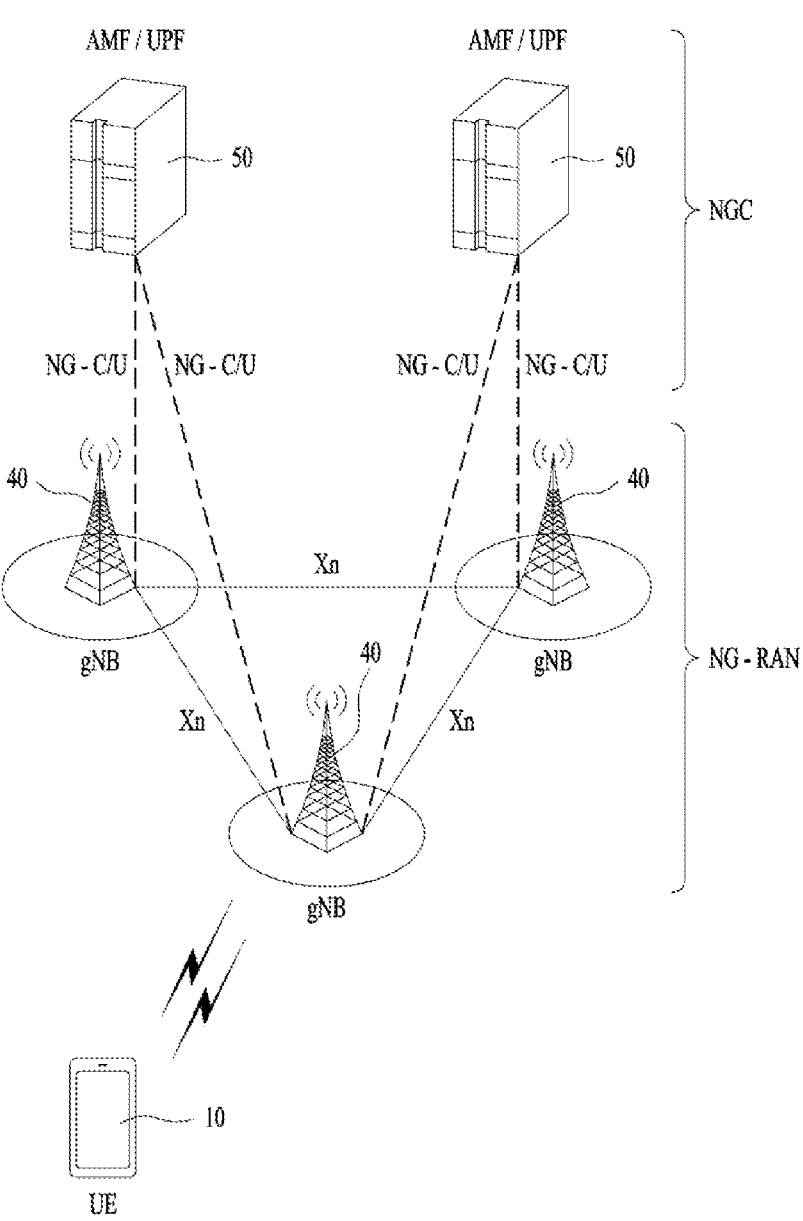
FIG. 2 illustrates the structure of an NR system to which embodiment(s) are applicable.

FIG. 2 illustrates the structure of a NR system to which the present disclosure is applicable.

Referring to FIG. 2, a next generation radio access network (NG-RAN) may include a next generation Node B (gNB) and/or an eNB, which provides user-plane and control-plane protocol termination to a UE. In FIG. 2, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 3:
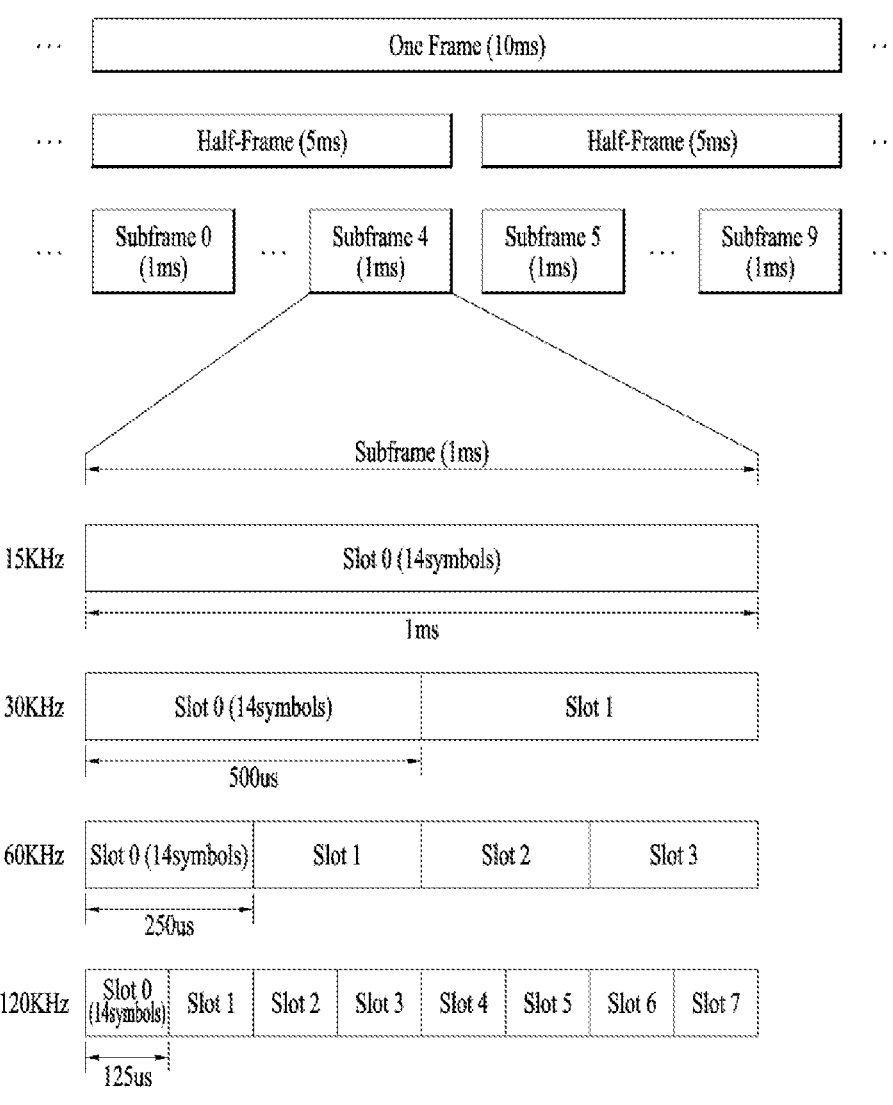
FIG. 3 illustrates the structure of an NR radio frame to which embodiment(s) are applicable.

FIG. 3 illustrates the structure of a NR radio frame to which the present disclosure is applicable.

Referring to FIG. 3, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration $\mu$ in the NCP case.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
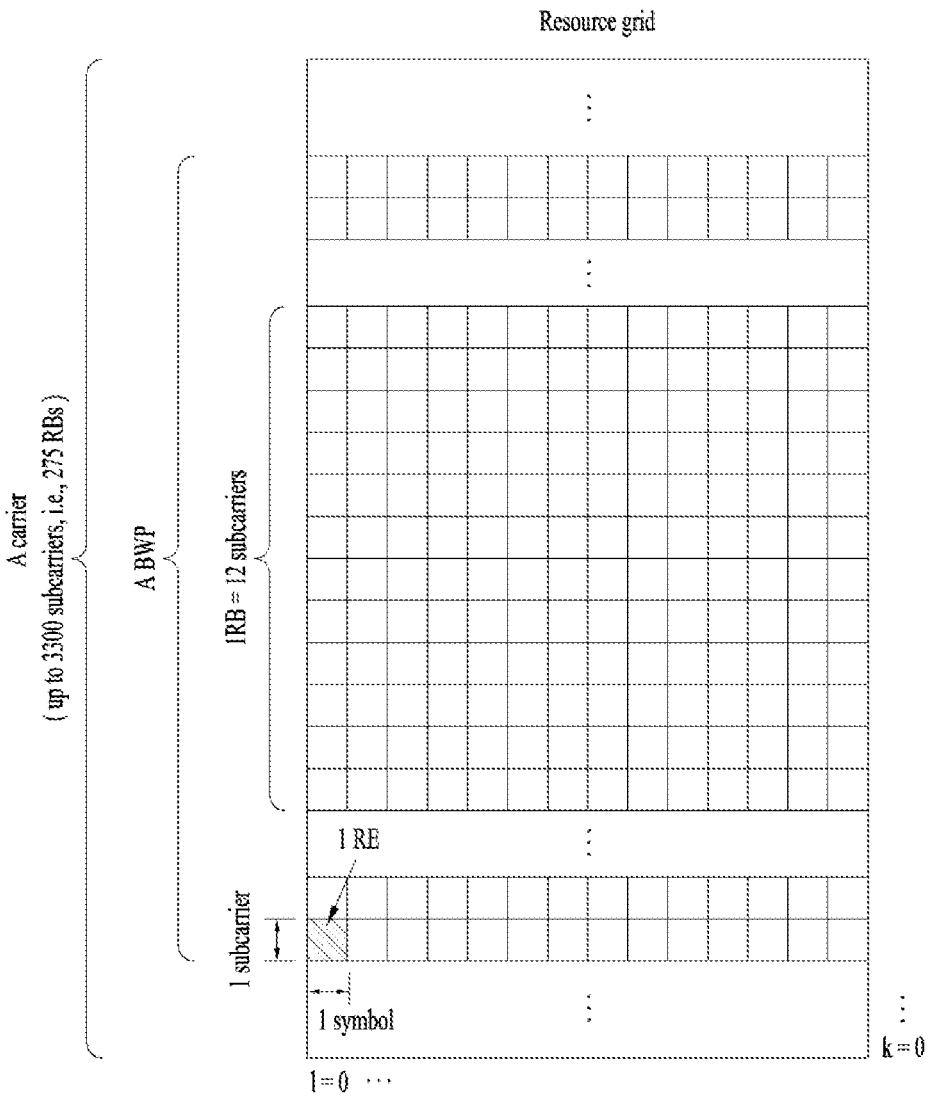
FIG. 4 illustrates the slot structure of an NR frame to which embodiment(s) are applicable.

FIG. 4 illustrates the slot structure of a NR frame to which the present disclosure is applicable.

Referring to FIG. 4, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Figure 5:
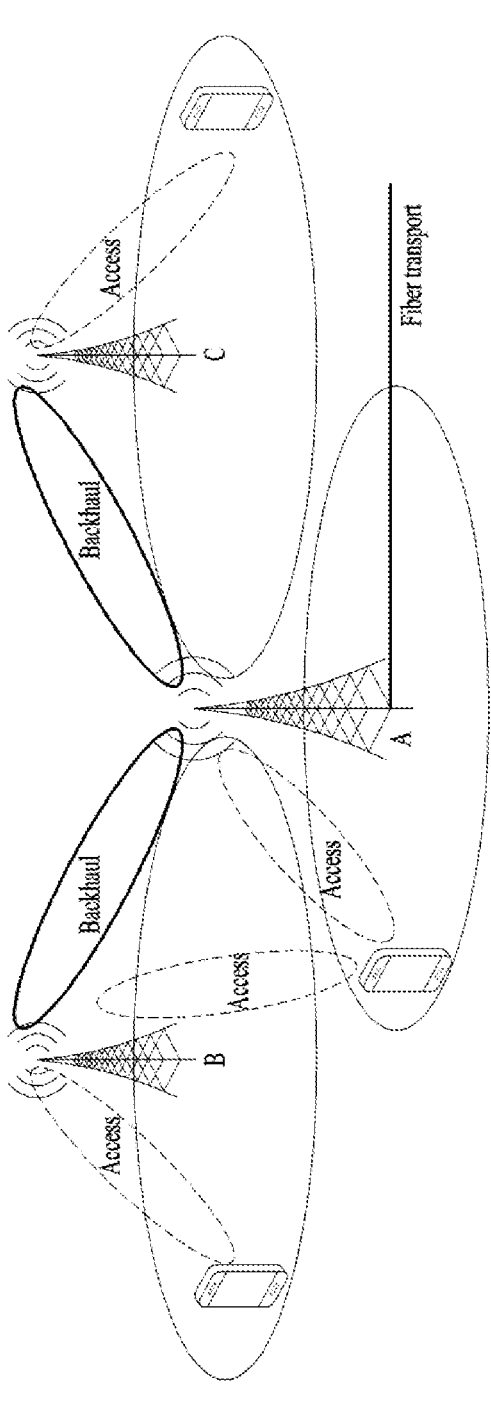
FIG. 5 is a schematic diagram of an example for an integrated access and backhaul link.

FIG. 5 is a schematic diagram of an example for an integrated access and backhaul link.

An example of a network with such integrated access and backhaul links is shown in FIG. 5, where an IAB node or relay node (rTRP) can multiplex access and backhaul links in time, frequency, or space (eg, beam-based operations).

The operations of different links may be at the same or different frequencies (also referred to as 'in-band' and 'out-band' relays). Efficient support of an out-band relay is important in some NR deployment scenarios, but it is very important to understand in-band operational requirements, which mean close interaction with an access link operating at the same frequency, to accept duplex constraints and avoid/mitigate interference.

In addition, operating an NR system in the mmWave spectrum may present several unique challenges, including experiencing severe short-term blocking that may not be easily mitigated by current RRC-based handover mechanisms due to the larger time scale required to complete a procedure in comparison to short-term blocking.

To overcome short-term blocking in mmWave systems, it may require a fast RAN-based mechanism (which does not necessarily require intervention of a core network) for inter-rTRP switching.

The need to mitigate short-term blocking of an NR operation in mmWave spectrum with the need for easier deployment of a self-backhauled NR cell may lead to the need for the development of an integrated framework that enables fast switching of access and backhaul links.

In addition, Over-The-Air (OTA) coordination between rTRPs may be considered as mitigating interference and supporting end-to-end route selection and optimization.

The following requirements and aspects may need to be resolved by an integrated access and wireless backhaul (IAB) for NR.

Efficient and flexible operation for in-band and out-band broadcasting in indoor and outdoor scenarios Multi-hop and redundant connections End-to-end route selection and optimization Backhaul link support with high spectrum efficiency Legacy NR UE support Legacy NR (new RAT) is designed to support half-duplex devices. In addition, half duplex of an IAB scenario is supported and worthy of being targeted. Furthermore, a full duplex IAB device may be studied.

In the IAB scenario, if each IAB node or Relay Node (RN) does not have scheduling capability, a Donor gNB (DgNB) must schedule the entire links among DgNB-related RNs and UEs. In other words, the DgNB may collect traffic information from all related RNs, make scheduling decisions for all links, and then inform each RN of schedule information.

Figure 6:
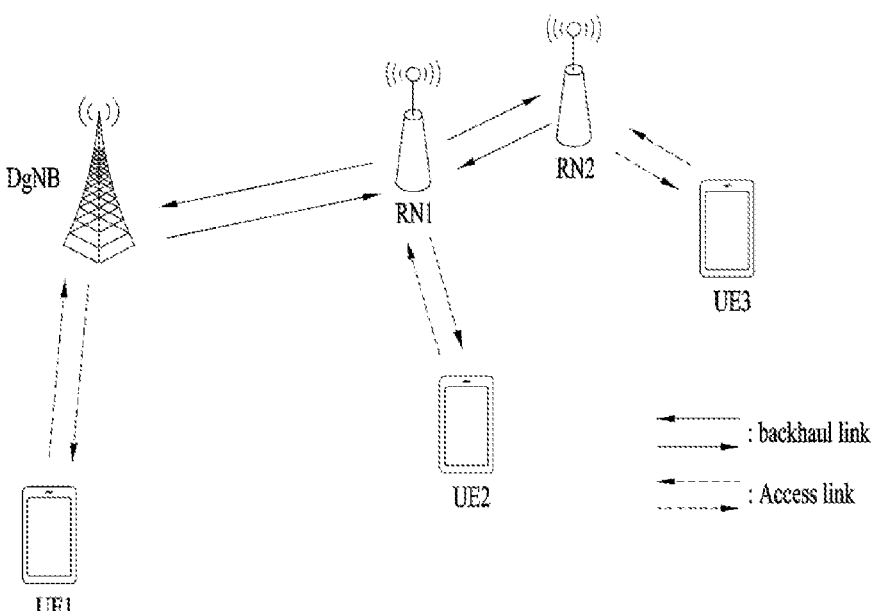
FIG. 6 schematically illustrates an example of links among DgNB, RN, and UE.

FIG. 6 schematically illustrates an example of links among DgNB, RN, and UE.

According to FIG. 6, a link between DgNB and UE1 may mean an access link, a link between RN1 and UE2 may mean an access link as well, and a link between RN2 and UE3 may mean an access link as well.

Likewise, according to FIG. 6, for example, a link between DgNB and RN1 and a link between RN1 and RN2 may mean backhaul links, respectively.

For example, as in the example of FIG. 6, a backhaul link and an access link may be configured, and in this case, the DgNB may not only receive a scheduling request of the UE1 but also receive a scheduling request of each of the UE2 and the UE3. Thereafter, the scheduling decision of two backhaul links and three access links may be made and the scheduling result may be notified. Thus, this centralized scheduling includes delay scheduling and latency issues.

On the other hand, distributed scheduling may be performed if each RN has a scheduling ability. This allows immediate scheduling for an uplink scheduling request of a UE, and allows a backhaul/access links to be utilized more flexibly by reflecting surrounding traffic conditions.

Figure 7:
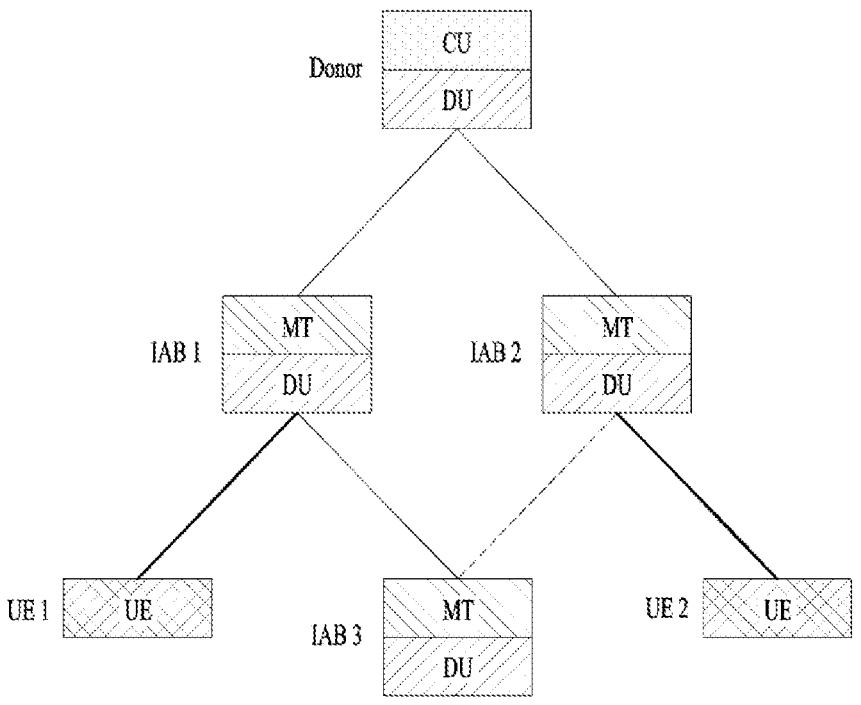
FIG. 7 schematically illustrates an example of a backhaul link and an access link.

FIG. 7 schematically illustrates an example of a backhaul link and an access link.

As shown in FIG. 7, a link between a donor node and an IAB node or a link between IAB nodes is referred to as a backhaul link. On the other hand, a link between a donor node and an UE or a link between an IAB node and a UE is referred to as an access link. That is, a link between MT and parent DU or a link between DU and child MT may be called a backhaul link, and a link between DU and UE may be called an access link.

Figure 8:
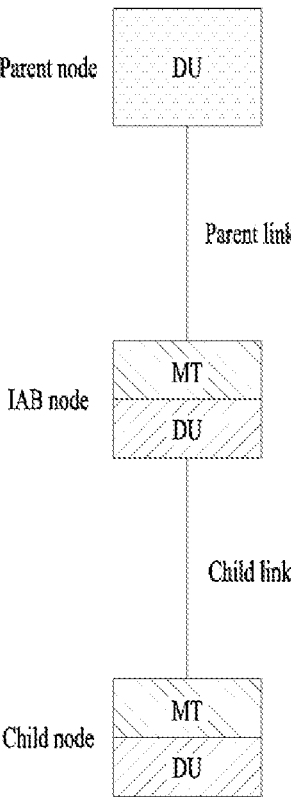
FIG. 8 schematically illustrates an example of a parent link and a child link.

FIG. 8 schematically illustrates an example of a parent link and a child link.

As shown in FIG. 8, a link between an IAB node and a parent node is called a parent link, and a link between an IAB node and a child node/UE is called a child link. That is, a link between MT and parent DU is called a parent link, and a link between DU and child MT/UE is called a child link.

Yet, depending on interpretation or perspective, a link between an IAB node and a parent node may be called a backhaul link, and a link between an IAB node and a child node/UE may be called an access link.

An IAB node may receive a slot format configuration for communication with a parent node and a slot format configuration for communication with a child node/access UE.

As described above, an IAB node is configured with MT and DU, and a resource configuration for communication with parent node(s) by the MT is referred to as an MT configuration, and a resource configuration for communication with child node(s) and access UE(s) is referred to as a DU configuration.

More specifically, regarding an MT configuration, an IAB node may give a link direction information on a parent link between a parent node and the IAB node itself for communication with the parent node. Regarding a DU configuration, an IAB node may give a link direction and availability information on a child pink between a child node/access UE and the IAB node itself for communication with the child node/access UE.

Terms used in this specification may be as follows.

IAB node (IAB-node): a RAN node that supports radio access to the terminal(s) and supports wireless backhaul of access traffic.

IAB donor (IAB-donor): a RAN node that provides the core network the UE's interface and the radio backhaul function to the IAB node(s).

Hereinafter, each abbreviation may correspond to an abbreviation of the following terms.

IAB: Integrated Access and Backhaul
CSI-RS: Channel State Information Reference Signal
DgNB: Donor gNB (Donor gNB)
AC: Access
BH: Backhaul
DU: Distributed Unit
MT: Mobile terminal
CU: Centralized Unit
IAB-MT: IAB mobile terminal
NGC: Next-Generation Core network
SA: Stand-alone
NSA: non-stand-alone
EPC: Evolved Packet Core On the other hand, from the IAB node MT point of view, time domain resource(s) of the following type(s) may be indicated for the parent link.

Downlink time resources;
uplink time resources;
Flexible time resources.

From an IAB node DU perspective, a child link may have time domain resource(s) of the following type(s).

Downlink time resources;
uplink time resources;
Flexible time resources;
Unavailable time resource(s) (resource(s) not used for communication on DU child link(s)).

The downlink, uplink, and flexible time resource type(s) of the DU child link may belong to one of the following two categories.

Hard: the corresponding time resource is always available for the DU child link;
Soft: The availability of the corresponding time resource for the DU child link may be explicitly and/or implicitly controlled by the parent node.

From the IAB node DU perspective, the child link has four types of time resources: downlink (DL), uplink (UL), flexible (F), and not available (NA). Here, the unavailable resource may mean that the resource is not used for communication on the DU child link(s).

Each of the downlink, uplink and flexible time resources of the DU child link may be hard or soft resources. As described above, hard resources may mean that communication is always possible in the DU child link. However, in the case of soft resources, communication availability in the DU child link may be explicitly and/or implicitly controlled by the parent node.

In such a situation, the setting in the link direction (DL/UL/F/NA) and link availability (hard/soft) of the time resource for the DU child link may be called 'DU configuration'.

This setting can be used for effective multiplexing and interference handling among IAB node(s). For example, this setting can be used to indicate which link is valid for the time resource between the parent link and the child link.

In addition, since configuring only a subset of the child node(s) can utilize time resources for DU operation, it can be used to adjust interference among the child node(s).

Considering this aspect, the DU configuration may be more effective when the DU configuration is semi-static and can be configured specifically for the IAB node.

On the other hand, similar to the SFI setting for the access link, the IAB node MT may have three types of time resources for the parent link: downlink (DL), uplink (UL), and flexible (F).

Figure 9:
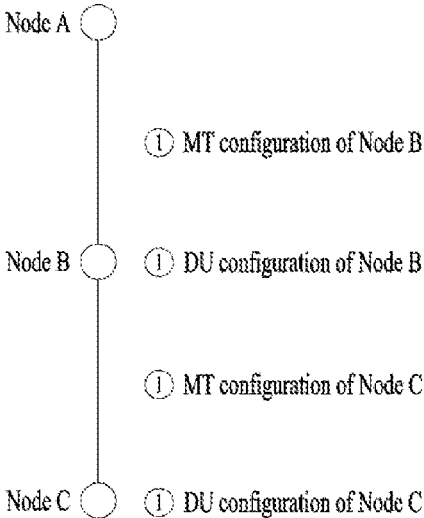
FIG. 9 is a diagram schematically illustrating a configuration between nodes.

FIG. 9 is a diagram schematically illustrating a configuration between nodes.

As shown in ① of FIG. 9, the IAB node receives the MT setting that informs the link direction information on the parent link between the parent node and itself for communication with the parent node. In addition, as shown in ② of FIG. 9, a DU setting indicating link direction and link use availability information that can be used for communication to its own child link is set.

Figure 10:
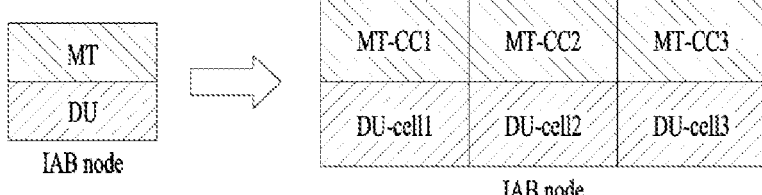
FIG. 10 schematically illustrates that an MT and a DU of an IAB node are configured with a plurality of CCs.

FIG. 10 schematically illustrates that an MT and a DU of an IAB node are configured with a plurality of CCs.

Figure 14:
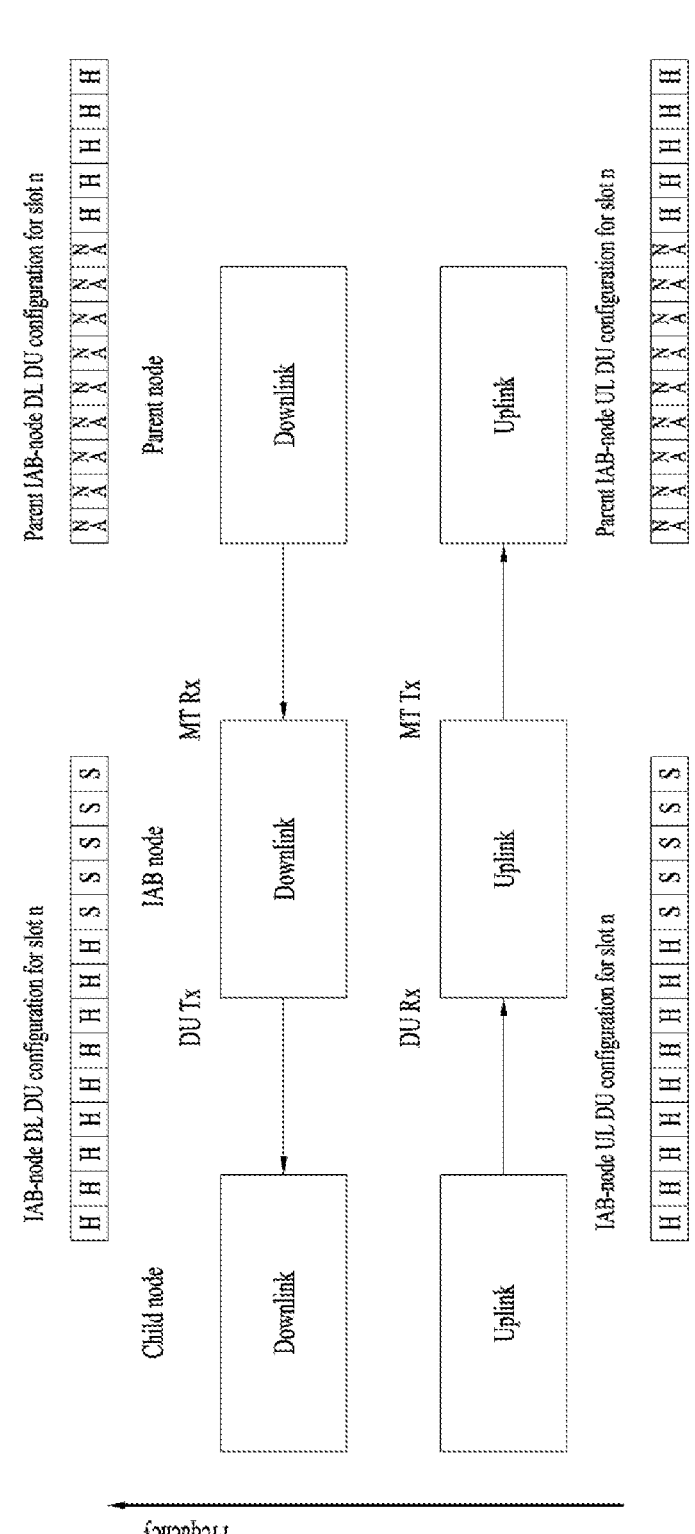

Referring to FIG. 10, an MT and a DU of an IAB node may be configured with a plurality of Component Carriers (CCs). In this case, different CCs may operate in the same or different frequency regions, or may use the same or different panels. For example, as shown in FIG. 14, there may be three CCs of each of the MT and the DU in the IAB node. In the figure, the three CCs present in the MT are referred to as MT-CC1, MT-CC2, and MT-CC3, respectively. In the case of the DU, CCs are replaced with cells and are referred to as DU-cell 1, DU-cell 2, and DU-cell 3, respectively.

In this case, one of TDM, SDM/FDM, and FD multiplexing methods may apply between a specific CC of the MT and a specific cell of the DU. For example, if a specific MT-CC and a specific DU-cell are located in frequency regions of different inter-bands, respectively, FD may apply between the corresponding MT-CC and the corresponding DU-cell. On the other hand, TDM may apply between an MT-CC and a DU-CC located in the same frequency region. In FIG. 14, MT-CC1, MT-CC2, DU-cell1, and DU-cell 2 have f1 as a center frequency, MT-CC3 and DU-cell 3 have f2 as a center frequency, and f1 and f2 may be positioned in an inter-band. In this case, from the perspective of the MT-CC1 (or the MT-CC2), it may operate by TDM with the DU-cell 1 and the DU-cell 2, but it may operate by FD with the DU-cell 3. On the other hand, from the perspective of the MT-CC3, it may operate by FD with the DU-cell 1 and the DU-cell 2, but may operate by TDM with the DU-cell 3.

On the other hand, different multiplexing methods may apply between an MT and a DU even within the same CC. For example, a plurality of parts may exist in an MT-CC and/or DU-cell. Such a part may mean, for example, a link transmitted via an antenna having the same center frequency but a physical location difference or a link transmitted via a different panel.

Alternatively, it may mean, for example, a link transmitted through a different BWP despite the same center frequency. In this case, for example, when two parts are present in the DU-cell 1, a specific MT-CC or a multiplexing type operating with a specific part in the specific MT-CC may be different for each part. The content of the following specification describes a case that a multiplexing type applying per pair of a CC of an MT and a cell of a DU, but the content of the specification may be extended to apply to a case that an MT and a DU are divided into a plurality of parts and that a multiplexing type applying per pair of a CC and part of the MT and a cell and part of the DU may be different.

Meanwhile, it may be considered that one IAB node is connected to two or a plurality of parent nodes. In this case, an IAB MT may be connected to two parent DUs using a dual-connectivity method.

An IAB node may have redundant route(s) to an IAB donor CU. For IAB nodes(s) operating in SA mode, an NR DC may be used to activate route redundancy in BH by allowing an IAB-MT to have BH RLC channel(s) and two parent nodes simultaneously.

A parent node may have to connect to the same IAB donor CU-CP that controls establishment and release of redundant route(s) through two parent nodes.

A parent node may obtain roles of a master node and an auxiliary node of an IAB-MT together with an IAB donor CU. An NR DC framework (e.g. MCG/SCG-related procedures) may be used to establish a dual radio link with parent node(s).

Default IAB Behavior in Paired Spectrum

Hereinafter, for convenience of description, the contents are described only by presupposing or assuming an in-band environment, and the contents described below may be applicable even in an out-band environment. Furthermore, the description is given or presupposed when a Donor gNB (or DgNB), a Relay Node (RN), and a UE perform a half-duplex operation, but the contents described below may be applicable to an environment in which a Donor gNB (or DgNB), a Relay Node (RN), and a UE perform a full-duplex operation.

For convenience of description, when a first node (Node 1) and a second node (Node 2) exist and the first node relays data transmitted to or received from the second node, the first node may be defined as a parent node of the second node, and the second node may be defined as a child node of the first node.

Hereinafter, described in detail is a method of performing a default operation between an IAB DU and an MT effectively by an IAB system (or Rel-16 IAB system) in an Integrated Access and Backhaul (IAB) system consisting of multiple hops supported by a paired spectrum Frequency Division Duplex (FDD).

An operation between a DU and an MT has been defined in the conventional premise that an IAB node or system operates primarily by mainly targeting an unpaired spectrum Time Division Duplex (TDD) (e.g., a use case of using FR2 as a wireless backhaul link). Here, the IAB node may be defined as a relay node.

Figure 11:
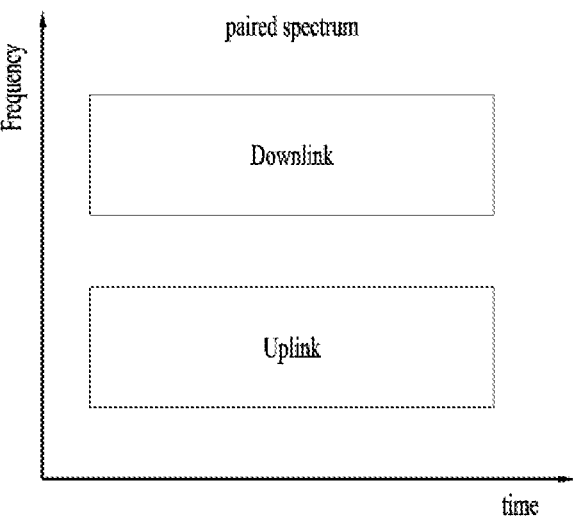
FIG. 11 is a diagram illustrating a method of using time/frequency resources in a paired/unpaired spectrum.
Figure 11:
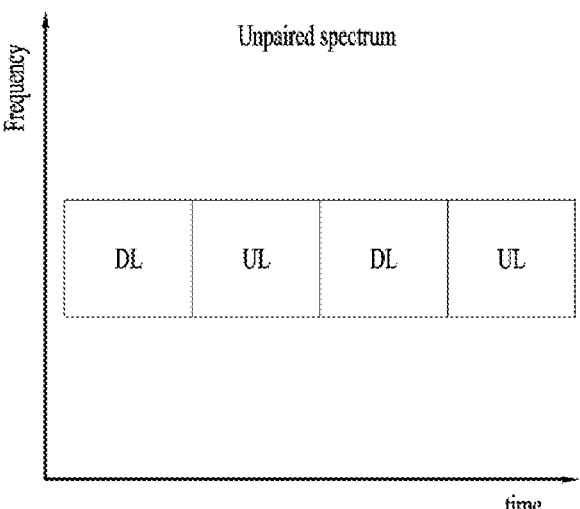

FIG. 11 is a diagram illustrating a method of using time/frequency resources in a paired/unpaired spectrum.

Referring to FIG. 11, resources for uplink and downlink are separated in different ways according to a paired spectrum and an unpaired spectrum.

Specifically, a paired spectrum is a connection method using downlink and uplink separated by different frequency bands. An unpaired spectrum is a connection method that uses downlinks and uplinks (or one frequency band) separated in a time domain.

Meanwhile, the following scenario may be considered for an IAB system so that the IAB system can operate effectively in a paired spectrum.

In the above scenario, for the paired spectrum, the H/S/NADU resource configuration framework may be extended with the following.

Two separate H/S/NA per-cell DU semi-static configurations are provided (with slot level resolution) for downlink and uplink.

With reference to the above scenario, in the existing unpaired spectrum, an H/S/NA DU resource configuration is set per DU basis, but in the paired spectrum, a corresponding H/S/NA resource configuration may be set independently for each of DL and UL (H: Hard, S: Soft, NA: non-available).

Here, the H/S/NA is an attribute indicating availability of a given resource. In particular, the H/S/NA indicates the degree of availability for a resource direction of Uplink/Downlink/Flexible (U/D/F) indicated by a slot format indicator in TDD. For example, in most cases, a resource indicated by H is used, a resource indicated by NA is not used, and in the case of a resource indicated by S, whether to use may be determined in an explicit/implicit manner.

In addition, the scenario defines an operation of reporting multiplexing capability of an UAB node as follows.

The donor CU and the parent node can be made aware of the multiplexing capability between MT and DU (TDM required, TDM not required) of an IAB node to for any {MT CC, DU cell} pair)

The indication of the multiplexing capability for the case of no-TDM between IAB MT and IAB DU is additionally provided with respect to each transmission/reception-direction combination (per MT CC/DU cell pair).

MT-TX/DU-TX
MT-TX/DU-RX
MT-RX/DU-TX
MT-RX/DU-RX

Referring to the scenario, an IAB node may perform a basic operation based on TDM. Here, the TDM may mean that an operation between an IAB-DU and an IAB-MT (or an IAB-DU operation and an IAB-MT operation) is TDMed at a given bandwidth. That is, the operation of the IAB node based on the TDM may more appropriately apply to an operation in TDD.

In addition, according to the scenario, an IAB node having a high multiplexing capability among IAB nodes may perform operations other than TDM (e.g., when FDM/SDM may be supported) with respect to at least one of the {MTCC, DU cell} pairs. In this case, the IAB node may signal the multiplexing ability (for example, TDM is not required) for a transmission/reception direction combination capable of operations other than TDM among the above-described four transmission/reception direction combinations (MT-TX/DU-TX, MT-TX/DU-RX, MT-RX/DU-TX, MT-RX/DU-RX). That is, the IAB node may report the multiplexing capability to the CU or the parent node. The CU or the parent node may perform scheduling for supporting FDM/SDM with respect to a corresponding transmission/reception direction combination based on the reported multiplexing capability ("not TDM required"). Meanwhile, problems such as collision, timing and the like between resources according to the scheduling may be solved through the IAB implementation.

As a result, when the IAB node does not report the multiplexing capability for each of the transmission/reception direction combinations, the TDMed DU and MT operations may be default operations. In other words, it may be assumed that simultaneous transmission and reception between the DU operation and the MT operation are not supported at the IAB node. Here, the assumption or default operation described in the above scenario applies to a case that a paired spectrum is supported in the IAB system as well.

In this case, the above-described default operation may be an operation that is not suitable for the introduction of the paired spectrum in an IAB system in which the paired spectrum is supported. Hereinafter, a more efficient default operation of an IAB node in the IAB system in which the paired spectrum is supported will be described.

Figure 12:
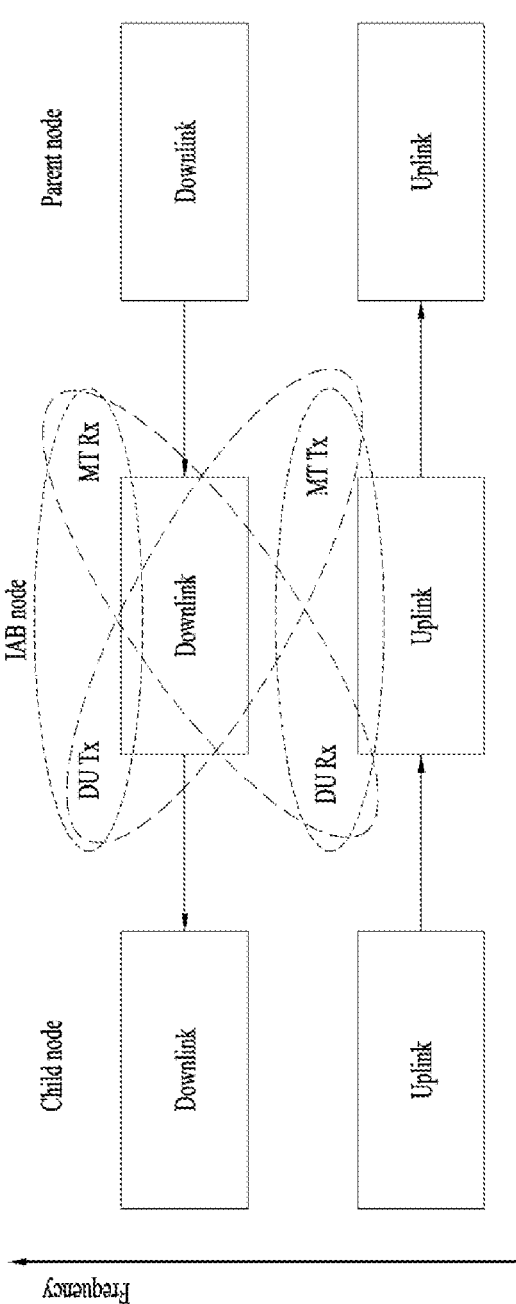
FIG. 12 is a diagram to describe a default operation of an IAB node in a paired spectrum supported system.

FIG. 12 is a diagram to describe a default operation of an IAB node in a paired spectrum supported system.

Referring to FIG. 12, the IAB node may perform a DU operation (DU-TX, DU-RX) and an MT operation (MT-TX, MT-RX). Transmission/reception direction combinations related to the DU operation and the MT operation may include DU-TX (DU transmission operation) and MT-RX (MT reception operation), DU-TX and MT-TX (MT transmission operation), DU-RX (DU reception operation), and MT-RX (or transmission/reception operation combinations).

As described above, when there is no multiplexing capability report for transmission/reception operation combinations between the DU operation and the MT operation, the IAB node may perform the MT operation and the DU operation based on the TDM even though a paired spectrum is supported. In other words, the MT operation and the DU operation may be performed separately in the time domain. In this case, it may conflict with the purpose of supporting the paired spectrum. For example, when the multiplexing capability for the DU-TX and MT-TX combination is not reported, it may be interpreted that the DU-TX (or DU-RX) operation for a DL carrier and the MT-TX (or MT-RX) operation for a UL carrier are not simultaneously performed. This may be an operation contrary to the purpose of introducing a paired spectrum. That is, even if the multiplexing capability of the IAB node is not reported, supporting the FDM as a default operation between the DU-TX and the MT-TX (and/or between the DU-RX and the MT-RX) may be more suitable for the purpose of introducing the paired spectrum.

Therefore, it is necessary to define a default operation more suitable for the purpose of introducing the paired spectrum, and a default operation according to a combination of transmission/reception directions may be defined as follows.

(1) Definition of a Default Operation for Each of the Above Transmission/Reception Direction Combinations In the case of a paired spectrum, if multiplexing capability is not reported in any {MT CC, DU cell} pair (or the transmission/reception direction combinations), a default operation may be configured as 'A' and/or 'B'.

A. For MT-Tx/DU-Rx and MT-Rx/DU-Tx combinations, a TDM operation between MT and DU is a default operation.

B. For MT-Tx/DU-Tx and MT-Rx/DU-Rx combinations, a no-TDM (or FDM, SDM) operation between MT and DU is a default operation.

(2) Multiplexing Capability Report Per Carrier

A report or indication of multiplexing capability in a paired spectrum may be a report of multiplexing capability between a DU operation and an MT operation per carrier. In other words, multiplexing capability is not reported separately by distinguishing transmission and reception operations of an MT and a DU in one carrier, but only the multiplexing capability between an MT operation and a DU operation (i.e., without distinction between transmission and reception directions) in one carrier may be reported. Here, the multiplexing capability may be a report on 'TDM required' or 'no TDM required' (or, SDM, FD, FDM). When the multiplexing capability per carrier is not reported, being TDMed between the DU operation and the MT operation may be a default operation.

(3) Forced Reporting of Multiplexing Capability Per Transmission Direction Combination In the case of a paired spectrum, an IAB node may necessarily be forced to report multiplexing capability for each of the four combinations of transmission/reception directions (MT-Tx/DU-Rx, MT-Rx/DU-Tx, MT-Tx/DU-Tx, MT-Rx/DU-Rx).

Meanwhile, when an IAB node is a low-cost IAB of which capability of each of a DU and/or an MT is less than a predetermined level, simultaneous transmission and reception on a DL carrier and a UL carrier may not be possible in the paired spectrum. In the case of such a low-cost IAB node, the IAB node may additionally report the multiplexing capability of (TDM required, TDM NOT required) for a combination of MT-RX/MT-Tx and DU-Tx/DU-Rx. That is, in the case of a low-cost IAB node, since TDM is applied by default to a combination of MT-Rx/MT-Tx and DU-Tx/DU-Rx, the report of the multiplexing capability (TDM required, TDM NOT required) needs to be performed not only on the four DU/MT transmission/reception direction combinations but also on the combination of MT-Rx/MT-Tx and DU-Tx/DU-Rx. In other words, the low-cost IAB may report multiplexing capability for each of a total of six transmission/reception direction combinations.

In contrast, in a paired spectrum, in case of a mid/high-cost IAB node (or an IAB node capable of simultaneous transmission and reception in each of a DU operation and an MT operation), since a default operation for the combination MT-Rx/MT-Tx and DU-Tx/DU-Rx is 'TDM NOT required', it is not necessary to report the multiplexing capability for the combination of MT-Rx/MT-Tx and DU-Tx/DU-Rx.

Additionally, the transmission and reception operation of the DU (or DU-cell) may mean an operation for 'DL carrier+UL carrier' in a paired spectrum. Accordingly, transmission/reception direction combinations between a DU and an MT for the multiplexing capability in the above-described scenario may be defined as follows.

UL MT-Tx/UL DU-Rx
DL MT-Rx/DL DU-Tx
UL MT-Tx/DL DU-Tx
DL MT-Rx/UL DU-Rx

In addition, in the case for a plurality of cells (e.g., a case that a cell of a DU exists and that two MT CCs exist per DL/UL carrier), the report of the multiplexing capability may be performed for each of the possible combinations of transmission/reception directions between a DU and an MT in each of the (DL1, UL1) and (DL2, UL2). A single or plurality of MTs (MT-CCs) may exist per cell, and in this case, the multiplexing capability defined above may be reported according to a combination of DU-cell and MT CC.

Figure 13:
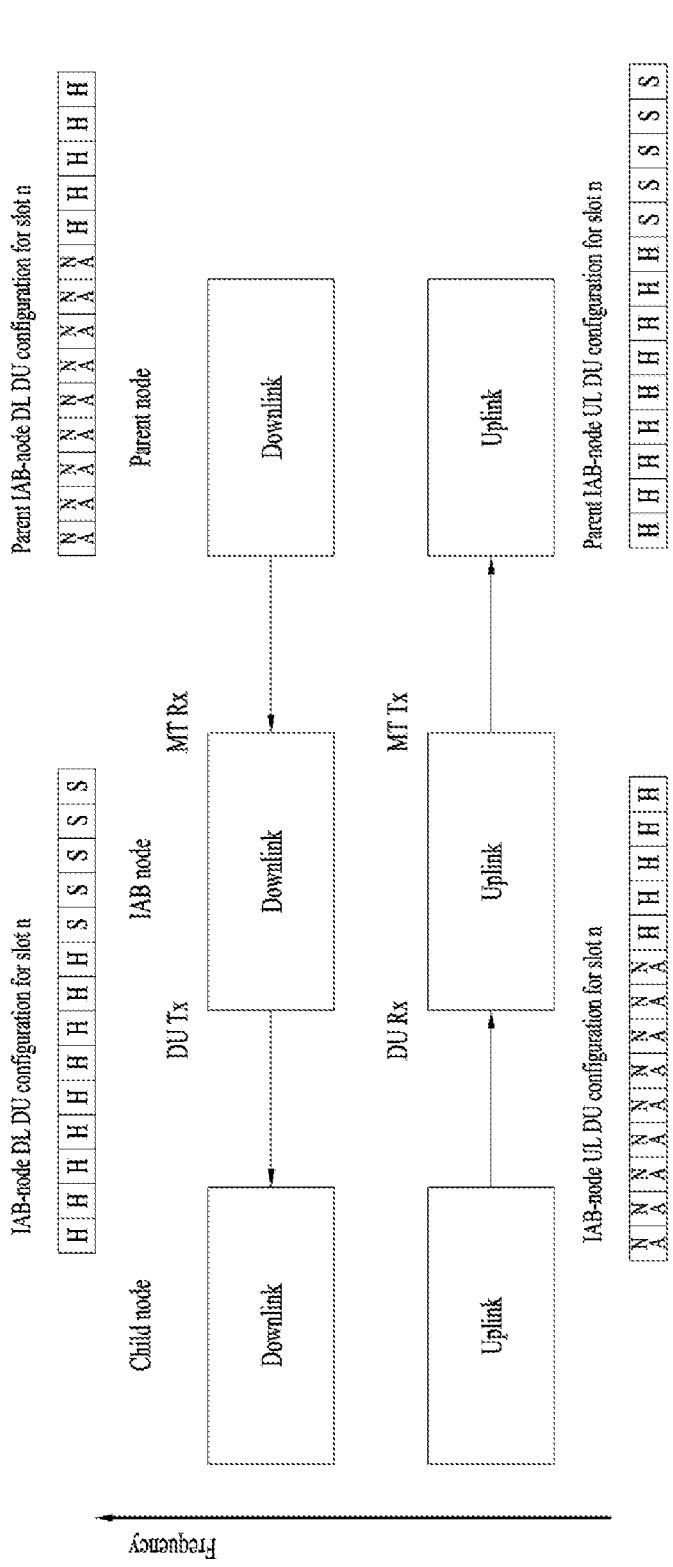
FIGS. 13 to 15 are diagrams to describe a method of receiving configurations of resources for a DU operation and an MT operation by an IAB node.
Figure 15:
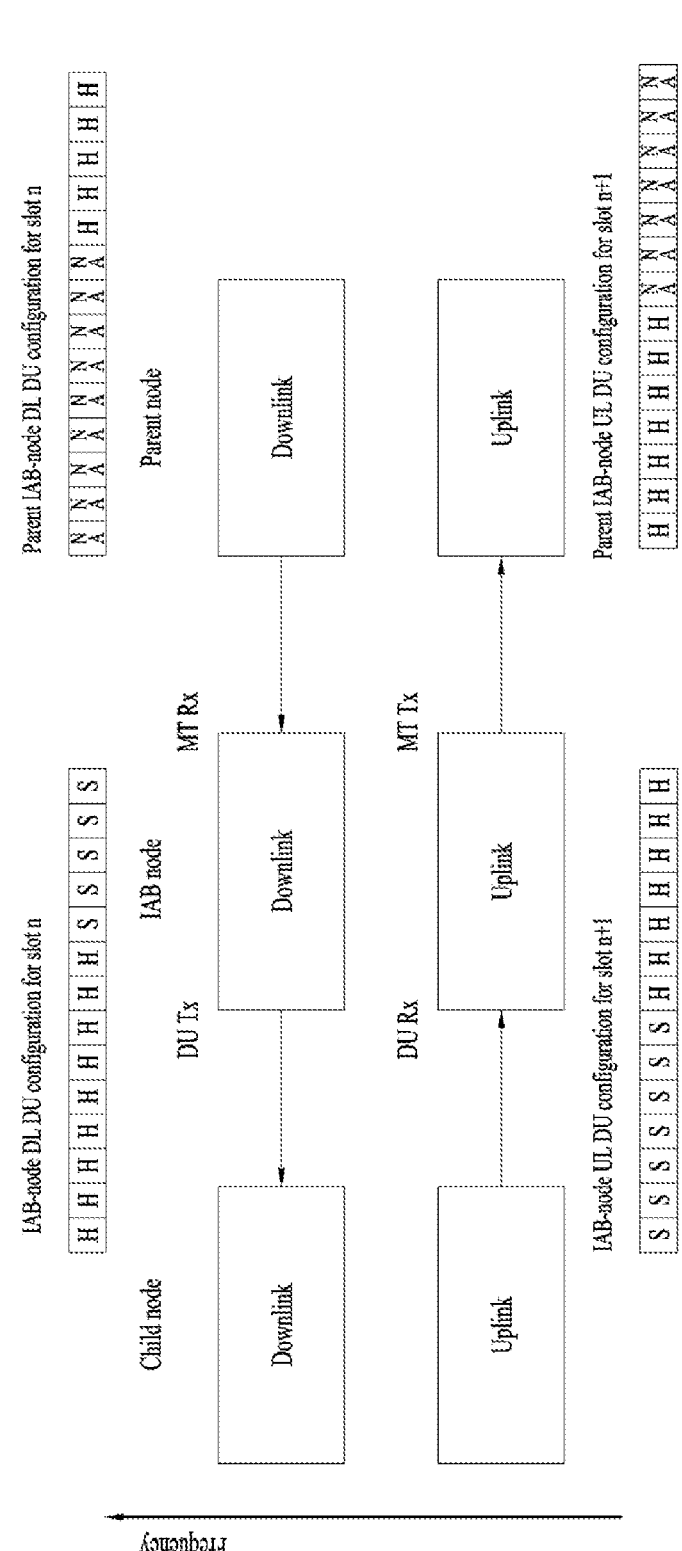

FIGS. 13 to 15 are diagrams to describe a method of receiving configurations of resources for a DU operation and an MT operation by an IAB node.

The IAB node may receive a setting or scheduling of a resource configuration for each of DU/MT from a donor node or a CU in an IAB system. Specifically, the IAB node may receive a signaling of a D/U/F resource configuration for an IAB DU through an F1 Application Protocol (AP) and a signaling of a D/U/F resource configuration for an IAB MT through RRC and/or DCI (similarly to a UE). Alternatively, it may receive a signaling of a resource availability setting (H/S/NA) for an IAB DU through F1-AP and/or DCI.

Meanwhile, the CU and/or donor node may be a subject of the scheduling of the resource configuration for the IAB MT. The CU and/or donor node may directly instruct the scheduling information to the IAB node or may instruct or transmit the scheduling information to the IAB node through a parent IAB node. Alternatively, the information on D/U/F may not be indicated in a paired spectrum, and in this case, 'F' may be assumed for a DL and/or a UL carriers both.

The IAB-node (or Parent IAB-node) may perform transmission and reception for uplink and downlink according to the resource configuration set/indicated from the CU and/or donor node.

Referring to FIG. 13, an IAB node capable of simultaneous operations of DU TX/MT TX and DU RX/MT RX may receive a DU resource configuration for a slot n. Here, a DL/UL DU configuration for a parent IAB-node (i.e., a parent IAB-node DL DU configuration for slot n/parent IAB-node UL DU configuration for slot n) may correspond to a DL/UL configuration related to an MT from the perspective of the AIB node. That is, a first resource configuration information is a resource configuration information corresponding to a DL/UL DU configuration for the parent IAB-node, and a second resource configuration information is a DL/UL DU configuration for the IAB node.

Specifically, the IAB-node may receive a setting of symbols 0 to 8 capable of simultaneously performing DU-TX and MT-TX operations in slot n, and a setting of symbols 9 to 13 capable of simultaneously performing DU-RX and MT-RX operations in the slot n. Meanwhile, DU-TX and DU-RX operations may be performed based on TDM, and MT-TX and MT-RX operations may also be performed based on TDM. Here, for convenience of description, a guard symbol/gap for Rx-Tx switching or the like is not reflected, and even when the guard symbol/gap is included, the above description may be applicable thereto.

Alternatively, when the multiplexing capability is not reported between the DU and the MT, the IAB may receive a setting of a slot n including symbols 0 to 8 for simultaneously performing the DU-TX and MT-TX operations and symbols 9 to 13 for simultaneously performing the DU-RX/MT-RX operations, as illustrated in FIG. 13. In addition, as illustrated in FIG. 13, symbols for DU-TX and symbols for MT-RX, and symbols for MT-TX and symbols for DU-RX are divided in a time domain, and thus the IAB node is unable to simultaneously perform DU-TX and MT-RX operations as well as MT-TX and DU-RX operations. That is, when the IAB node does not report the multiplexing capability between the DU and the MT, the IAB may receive a signaling of a resource configuration capable of simultaneously performing each of the DU-RX/MT-RX operation and the DU-TX/MT-TX operation as a default, and may receive a signaling of a resource configuration incapable of simultaneously performing each of the DU-TX/MT-RX operation and the DU-RX/MT-TX operation as a default.

Referring to FIG. 14, an IAB-node may be an IAB node that does not have multiplexing capability (where DU-MT is TDM-based) between DU and MT for transmission/reception direction combinations. Here, a DL/UL DU configuration for a parent IAB-node (parent IAB-node DL DU configuration for slot n/parent IAB-node UL DU configuration for slot n) may correspond to a DL/UL configuration related to the MT from the perspective of the IAB node. In this case, the IAB node may receive a setting of symbols 0 to 8 for a DU operation (UL/DL configuration for the DU) in a slot n, and an allocation of symbols 9 to 13 for an MT operation (UL/DL configuration for the MT) in the slot n. In other words, the IAB node having no multiplexing capability between the MT operation and the DU operation may receive a configuration of a resource for which simultaneous transmission and reception is allowed for each of the MT operation and the DU operation as the MT operation and the DU operation are separated in the time domain. Here, for convenience of description, a guard symbol/gap for Rx-Tx switching or the like is not reflected, and even when the guard symbol/gap is included, the above description may apply thereto.

Alternatively, if it is reported that there is no multiplexing capability between DU RX and MT RX operations and between DU TX and MT TX operations, the IAB node may receive an allocation of symbols 0 to 8 for a DU operation (UL/DL configuration for DU) in a slot n and an allocation of symbols 9 to 13 for an MT operation (UL/DL configuration for MT) in the slot n.

Meanwhile, an IAB node or UE may have multiplexing capability of Half Duplex FDD (HD-FDD) that supports or uses only UL or DL carriers at a single timing point. In consideration of this case, reporting of multiplexing capability for DU-Tx/DU-Rx and/or MT-Tx/MT-Rx may be additionally required for the IAB node.

Specifically, the IAB node having reported the multiplexing capability for the DU-Tx/DU-Rx and/or MT-Tx/MT-Rx may operate in full duplex-FDD for each of the DU and the MT. In contrast, the IAB node having no multiplexing capability or failing to report the multiplexing capability may operate in HD-FDD for each of the DU and the MT. That is, the IAB-donor or CU may instruct or set a resource configuration for each of the DU operation and the MT operation based on the reported multiplexing capability for the DU-Tx/DU-Rx and/or the MT-Tx/MT-Rx.

Alternatively, an IAB node (DU or MT) with HD-FDD capability fails to support DU-Tx/DU-Rx or MT-Tx/MT-Rx simultaneously (simultaneous operation), which may be a default operation. An IAB node (or DU or MT) with FD-FDD capability supports DU-Tx/DU-Rx or MT-Tx/MT-Rx simultaneously (simultaneous operation), which may be a default operation. The above-described operation of the UE or the IAB node may be performed according to the example shown in FIG. 15.

Referring to FIG. 15, a DU resource configuration of an IAB node having HD-FDD capability may be configured with a DL resource for a DU-Tx operation with respect to symbols 0 to 8 in a slot n, and may be configured with a DL resource for an MT-RX operation with respect to symbols 9 to 13 in the slot n. Here, a DL/UL DU configuration for a parent IAB-node (parent IAB-node DL DU configuration for slot n/parent IAB-node UL DU configuration for slot n+1) may correspond to a DL/UL configuration related to an MT from the perspective of the IAB node. In other words, a resource for a DL carrier is configured in the slot n, the DL carrier may be occupied for the DU-TX operation up to symbols 0 to 8, and the symbols 9 to 13 may be occupied for the MT-RX operation. Next, in a slot n+1, symbols 0 to 6 may be allocated as a UL resource for MT-TX, and in the slot n+1, symbols 7 to 13 may be allocated as a UL resource or carrier for DU-RX. In other words, the resource for the UL carrier is configured in the slot n+1, the UL carrier may be occupied for the MT-TX operation up to symbols 0 to 8 in the slot n+1, and symbols 9 to 13 may be occupied for the DU-RX operation. Meanwhile, for convenience of explanation, a guard symbol/gap for Rx-Tx switching or the like is not reflected, and even when the guard symbol/gap is included, the above description may apply thereto.

That is, a DL/UL carrier is divided by time (TDM), and it may be determined whether to operate by TDM or Full Duplex (FD) according to the multiplexing capability between a DU operation and an MT operation at an IAB node. The multiplexing capability for Full Duplex (or the capability to perform both DU and MT operations of the IAB node) may be reported independently for each of DL and UL.

Hereinafter, an explicit availability signaling method for a soft resource among resources (or UL-DL configurations) configured after the multiplexing capability report described above will be described.

Specifically, in the above-described scenario, an explicit availability signaling for a DU soft resource may be indicated by DCI format 2_5, as shown in Table 5 below. In other words, a DCI related to IAB may be signaled by the following DCI format 2_5.

DCI format 2_5 is used for notifying the availability of soft resources. The following information is transmitted by means of the DCI format 2_5 with CRC scrambled by AI-RNTI.
Availability indicator 1, Availability indicator 2 . . . Availability indicator N The size of DCI format 2_5 with CRC scrambled by AI-RNTI is configurable by higher layers up to [128] bits.

Referring to Table 5 below, since the Availability Indicator (AI) in the DCI format 2_5 is defined based on TDD, it may be defined or configured with 3 bits (8 states) for indicating D/U/F for soft symbols or resources in a slot.

TABLE 5

| Value | Meaning |
| --- | --- |
| 0 | D soft resources: no indication of availability |
|  | U soft resources: no indication of availability |
|  | F soft resources: no indication of availability |
| 1 | D soft resources: indicated available |
|  | U soft resources: no indication of availability |
|  | F soft resources: no indication of availability |
| 2 | D soft resources: no indication of availability |
|  | U soft resources: indicated available |
|  | F soft resources: no indication of availability |
| 3 | D soft resources: indicated available |
|  | U soft resources: indicated available |
|  | F soft resources: no indication of availability |
| 4 | D soft resources: no indication of availability |
|  | U soft resources: no indication of availability |
|  | F soft resources: indicated available |
| 5 | D soft resources: indicated available |
|  | U soft resources: no indication of availability |
|  | F soft resources: indicated available |
| 6 | D soft resources: no indication of availability |
|  | U soft resources: indicated available |
|  | F soft resources: indicated available |
| 7 | D soft resources: indicated available |
|  | U soft resources: indicated available |
|  | F soft resources: indicated available |

However, in the case of a paired spectrum, the concept of 'flexible' (or instruction on 'flexible') is not required because a link direction is clear. Accordingly, in the case of a paired spectrum, the AI may be newly defined as follows.

First, as defined in Table 6, the AI may be defined as a 1-bit indicator indicating two states for each of UL and DL. In this case, an AI for DL may indicate the availability of soft symbols (or soft resources) in DL, and an AI for UL may indicate the availability of soft symbols (or soft resources) in UL. In other words, an AI corresponding to each carrier (i.e., DL or UL) may be indicated respectively. Here, a granularity corresponding to each state in the AI may be a slot unit or a slot level.

TABLE 6

| Value | Meaning |
| --- | --- |
| 0 | no indication of availability |
| 1 | Soft resource is indicated as available |

Alternatively, the AI may be defined as a 2-bit indicator indicating a joint state (4 states) for UL and DL as shown in Table 7 below (Joint state indication for both UL/DL carriers).

TABLE 7

| Value | Meaning |
| --- | --- |
| 0 | D soft resources: no indication of availability |
|  | U soft resources: no indication of availability |
| 1 | D soft resources: indicated available |
|  | U soft resources: no indication of availability |
| 2 | D soft resources: no indication of availability |
|  | U soft resources: indicated available |
| 3 | D soft resources: indicated available |
|  | U soft resources: indicated available |

Referring to Table 7, the AI may indicate availability for soft symbols (or soft resources) for both carriers (UL and DL). Here, the granularity corresponding to each state in the AI may be a slot unit or a slot level.

Alternatively, the AI may be defined for each of two carriers (i.e., DL and UL) as shown in Table 8 and/or Table 9 below, and may be configured as a 2-bit indicator for indicating four states corresponding to each carrier. Specifically, an AI for a downlink carrier may be configured as shown in Table 7, and may indicate availability of downlink resources and availability of flexible resources. Granularity corresponding to each state in the AI may be a slot level.

TABLE 8

| Value | Meaning |
| --- | --- |
| 0 | D soft resources: no indication of availability |
|  | F soft resources: no indication of availability |
| 1 | D soft resources: indicated available |
|  | F soft resources: no indication of availability |
| 2 | D soft resources: no indication of availability |
|  | F soft resources: indicated available |
| 3 | D soft resources: indicated available |
|  | F soft resources: indicated available |

Likewise, an AI for an uplink carrier may be configured as shown in Table 9, and may indicate the availability of uplink resources and the availability of flexible resources. Granularity corresponding to each state in the AI may be a slot level.

TABLE 9

| Value | Meaning |
|---|---|
| 0 | U soft resources: no indication of availability |
| | F soft resources: no indication of availability |
| 1 | U soft resources: indicated available |
| | F soft resources: no indication of availability |
| 2 | U soft resources: no indication of availability |
| | F soft resources: indicated available |
| 3 | U soft resources: indicated available |
| | F soft resources: indicated available |

Alternatively, an AI based on the existing 8 states (3-bit per slot) illustrated in Table 5 may be used. Specifically, an AI indicates the availability of soft symbols or resources according to Table 5, but an indication for flexible resources may be ignored. In other words, an IAB node may not expect or may ignore an indication for flexible resources among the state indications of the existing AIs (defined in Table 4).

Alternatively, an existing AU based on the existing 8 states (3-bit per slot) shown in Table 5 is used, and the IAB node may not expect that a value greater than or equal to a specific state (state 4) (or less than or equal to a specific state (state 3) is indicated by the AI, or may ignore an AI indicating a value equal to or greater/smaller than the specific state.

Meanwhile, the DCI format 2_5 including the AI may be applied to an IAB-DU (or a DU operation) even when received by an IAB-MT (or as an MT operation).

Alternatively, as described above, each AI may be configured differently according to an uplink/downlink approach manner. For example, an AI may be configured as an AI with a size of 3 bits as defined in Table 4 in case of an unpaired spectrum (or TDD-based), and may have a size of 1 bit (Table 6) or 2 bits (Table 7, Table 8, Table 9) in case of a paired spectrum (or FDD-based).

Alternatively, a field indicating availability of a soft resource (or a soft slot) may be configured differently depending on whether it is the TDD or the FDD. For example, a field indicating the availability of a soft resource in TDD may be configured as a first field (defined in Table 5) of a specific DCI format, and a field indicating the availability of a soft resource in FDD may be configured as a second field (defined in Table 7, Table 8, or Table 9) of the specific DCI format. Here, the first field may exist only when it is TDD (or an unpaired spectrum), and the second field may exist limitedly only when it is FDD (or a paired spectrum). Alternatively, the specific DCI format may include only the first field when it is TDD among the first field and the second field, and may include only the second field when it is FDD. Alternatively, the DCI format itself indicating availability of the soft resource may be configured differently depending on whether it is TDD or FDD.

Alternatively, in order to inform the availability of the soft resource, the same DCI format/field (e.g., 3-bit AI) may be used irrespective of whether it is TDD or FDD. In this case, the DCI format/field indicating the availability of the soft resource may be interpreted or decoded differently depending on whether it is TDD or an FDD. Specifically, despite using an existing AI based on the existing 8 states (3 bits per slot), an indication for the flexible resource may be ignored with respect to the FDD, or the IAB node may not expect that a value greater than or equal to a specific state (or state 4) (or less than or equal to state 3) is indicated. On the contrary, the indication for the flexible resource may be valid for the TDD.

Alternatively, the availability of the soft resource may be indicated or notified explicitly or implicitly (or directly or indirectly) depending on whether it is TDD or FDD. For example, in TDD (or unpaired spectrum), the availability of the soft resource may be explicitly/directly indicated through a specific field. In FDD (or paired spectrum), the availability of the soft resource may be explicitly/directly indicated through a combination of a plurality of fields.

Figure 16:
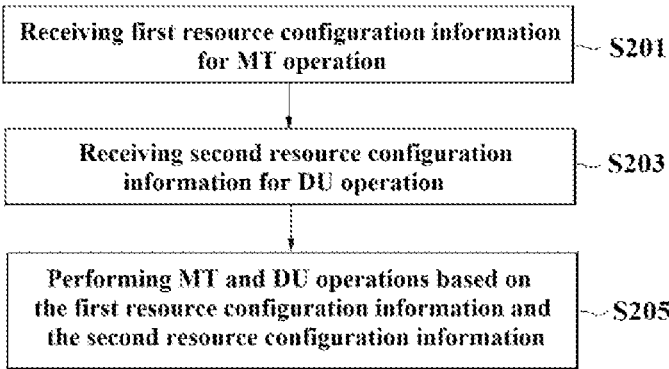
FIG. 16 is a diagram to describe a method of performing a DU operation and an MT operation based on resource configuration information configured by an IAB node.

FIG. 16 is a diagram to describe a method of performing a DU operation and an MT operation by an IAB node based on resource configuration information.

Referring to FIG. 16, the IAB node (or relay node) may receive a first resource configuration information on an MT operation scheduled by a donor node or a CU (or a network) (S201). The first resource configuration information may include a configuration information on a resource for the IAB node to transmit an uplink to a parent node (or a base station) and receive a downlink from the parent node as an MT operation, and may include an information indicating availability of a resource for the uplink-downlink through H/NA/S.

Next, the IAB node may receive a second resource configuration information on a DU operation scheduled by the donor node or the CU (or the network) (S203). The second resource configuration information may be a configuration information on a resource for the IAB node to receive an uplink from a child node and transmit a downlink to the child node as a DU operation. The second resource configuration information may include an information indicating availability of a resource for the uplink-downlink through H/NA/S.

Meanwhile, the IAB node may receive the first resource configuration information and the second resource configuration information based on a paired spectrum, and may receive the first resource configuration information and the second resource configuration information based on an unpaired spectrum. Hereinafter, for convenience of description, it will be described on the premise that each of the first resource configuration information and the second resource configuration information includes a resource configuration information on uplink and downlink (access manner according to FDD) based on the paired spectrum.

Next, the IAB node may perform the MT operation based on the first resource configuration information, and may perform the DU operation based on the second resource configuration information (S205).

As described in FIGS. 11 to 15, the first resource configuration information and the second resource configuration information may indicate available resources that may be used through H/NA/S. Specifically, the first resource configuration information may indicate a first available resource that may be used for the MT transmission operation in uplink and a second available resource that may be used for the MT reception operation in downlink. In addition, the second resource configuration information may indicate a third available resource that may be used for the DU transmission operation in downlink and a fourth available resource that may be used for the DU reception operation in uplink. Here, the first resource configuration information may be signaled by Radio Resource Control (RRC) (from the parent node or the donor node), and the second resource configuration information may be signaled by an F1 Application Protocol (AP) (from the parent node or the donor node).

The IAB node may simultaneously perform the DU operation and the MT operation based on the first resource configuration information and the second resource configuration information or may operate separately in a time region. The DU operation and the MT operation may be classified for each transmission/reception direction. Specifically, the DU operation may be divided into a DU transmission operation (or DU-TX) for transmitting a downlink or a downlink signal to the child node and a DU reception operation (or DU-RX) for receiving an uplink or an uplink signal from the child node. The MT operation may be divided into an MT reception operation (or MT-RX) for receiving a downlink or a downlink signal from the parent node and an MT transmission operation (or MT-TX) for transmitting an uplink or an uplink signal to the parent node.

In an IAB system in which a paired spectrum is supported, the IAB node may simultaneously perform the DU operation and the MT operation. In this case, the IAB node may report information on multiplexing capability on whether to perform the MT operation and the DU operation simultaneously, and may then receive a resource configuration information on simultaneously performing the MT operation and the DU operation.

Specifically, in the IAB system in which a paired spectrum is supported, the IAB node may report multiplexing capability for each of a presence or non-presence of possibility of simultaneous performance between the DU transmission operation and the MT reception operation, a presence or non-presence of possibility of simultaneous performance between the DU reception operation and the MT transmission operation, and a presence or non-presence of possibility of simultaneous performance between the DU transmission operation and the MT transmission operation, and a presence or non-presence of possibility of simultaneous performance between the DU reception operation and the MT reception operation (or transmission/reception direction combinations between MT and DU). The IAB may receive the scheduling of the first resource configuration information and the second resource configuration information for which the simultaneous performance of the MT operation and the DU operation is supported according to the report of the multiplexing capability for at least one of transmission/reception direction combinations between the MT and the DU.

Yet, when the IAB node does not report the multiplexing capability (or when the multiplexing capability for all transmission/reception direction combinations between the MT and the DU is not reported), the first resource configuration information and the second resource configuration information that are set by default need to be defined.

Specifically, even when the paired spectrum is supported in the existing IAB system, the IAB node may receive the first resource configuration information and the second resource configuration information in which the MT operation and the DU operation are distinguished temporally on the premise that the MT operation and the DU operation are not simultaneously performed when the multiplexing capability is not reported. In other words, the IAB may set a default operation that does not simultaneously perform the MT operation and the DU operation (or TDM is supported between the MT operation and the DU operation). However, this may degrade resource efficiency in an IAB systems where uplink and downlink of the approach manner of the FDD are supported according to the paired spectrum.

In this regard, when the multiplexing capability is not reported, a method of efficiently using resources according to a paired spectrum supported to the IAB system and scheduling the first resource configuration information and the second resource configuration information capable of efficient MT and DU operations of the IAB node may be required. Hereinafter, for convenience, the following description will be made on the assumption of a case that the IAB node does not report the multiplexing capability.

As described in FIGS. 11 to 15, the IAB node, which does not report the multiplexing capability, may receive the first resource configuration information and the second resource configuration information for not supporting simultaneous performance on some combinations among transmission/reception direction combinations between the MT and the DU but supporting simultaneous performance on other some combinations.

Specifically, the first resource configuration information and the second resource configuration information may include resource configuration information that supports simultaneous performance of the MT transmission operation and the DU transmission operation, that supports simultaneous performance of the MT reception operation and the DU reception operation without supporting simultaneous performance of the MT transmission operation and the DU reception operation, and that does not support simultaneous performance of the MT reception operation and the DU transmission operation. That is, the IAB node may simultaneously perform the MT transmission operation and the DU transmission operation, simultaneously perform the MT reception operation and the DU reception operation, perform the MT transmission operation and the DU reception operation by separating them in a time domain, and perform the MT reception operation and the DU transmission operation by separating them in the time domain (without performing them simultaneously), by default based on the first resource configuration information and the second resource configuration information.

Alternatively, the first resource configuration information and the second resource configuration information may include configuration information for allocating or configuring the first and fourth available resources divided in a time domain, the first and third available resources divided in a frequency domain, the second and third available resources divided in the time domain, and the second and fourth available resources divided in the frequency domain.

Next, the first resource configuration information and the second resource configuration information may include indication information on available resources, unavailable resources, and soft resources for which availability is not determined, as described above, for each of a downlink and an uplink. Here, the availability indication for the soft resource may be indicated through an Availability Indicator (AI) included in a DCI.

Meanwhile, as described above, the AI may be interpreted differently depending on whether FDD or TDD is supported. Specifically, when the FDD is supported, the IAB node may ignore a value equal to or greater than a preconfigured threshold value among values indicated by the AI. For example, when the AI is composed of 3 bits indicating 8 states (i.e., an existing AI in DCI format 2_5), the IAB node may ignore 4 or more of the values indicated by the AI or 3 or less of the values indicated by the AI. Alternatively, the IAB node may selectively ignore an availability for 'flexible' among availabilities corresponding to a value indicated by the existing AI.

Alternatively, the AI may be configured differently depending on whether FDD or TDD is supported. For example, when the FDD is supported, the AI may be defined as an indicator having a size of 2 bits indicating 4 states, or an indicator having a size of 1 bit indicating 2 states. On the other hand, when the TDD is supported, the AI may be defined as an indicator having a size of 3 bits indicating 8 states. Alternatively, when the FDD is supported, a DCI format including the AI may be preconfigured in a type different from the DCI format including the AI when the TDD is supported.

Figure 17:
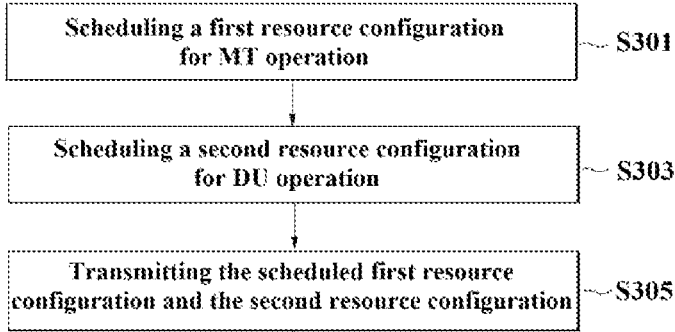
FIG. 17 is a diagram to describe a method of transmitting resource configuration information for each of a DU operation and an MT operation of an IAB node by a network.

FIG. 17 is a diagram to describe a method of transmitting resource configuration information for each of a DU operation and an MT operation of an IAB node by a network.

Referring to FIG. 17, a network that is the donor node or the CU may schedule or set a first resource configuration information on an MT operation of the IAB node (S301). The first resource configuration information may is a configuration information on a resource for the IAB node to transmit an uplink to a parent node (or a base station) and receive a downlink from the parent node as the MT operation, and may include an information indicating availability of resources for the uplink-downlink through H/NA/S. In addition, the network may schedule or set a second resource configuration information on a DU operation of the IAB node (S303). The second resource configuration information may be a configuration information on a resource for the IAB node to receive an uplink from a child node and transmit a downlink to the child node as the DU operation. The second resource configuration information may include an information indicating availability of resources for the uplink-downlink through H/NA/S.

Meanwhile, the network may schedule the first resource configuration information and the second resource configuration information based on a paired spectrum supported to an IAB system or a relay system. In addition, the network may schedule the first resource configuration information and the second resource configuration information based on an unpaired spectrum supported to the IAB system or the relay system. Hereinafter, for convenience, the following description will be made on the premise that each of the first resource configuration information and the second resource configuration information includes a resource configuration information for scheduling uplink and downlink (an approach manner according to FDD) based on the paired spectrum.

Next, the network may transmit the first resource configuration information and the second resource configuration information to the IAB node (S305). Here, the network may signal the first resource configuration information and the second resource configuration information to the IAB node directly or via the parent node.

Alternatively, the network may signal the first resource configuration information (from the parent node or the donor node) by Radio Resource Control (RRC) and signal the second resource configuration information (from the parent node or the donor node) through an F1 Application Protocol (AP).

As described in FIGS. 11 to 15, the first resource configuration information and the second resource configuration information may indicate available resources, which are usable, through H/NA/S. Specifically, the first resource configuration information may indicate a first available resource usable for the MT transmission operation in uplink and a second available resource usable for the MT reception operation in downlink. In addition, the second resource configuration information may indicate a third available resource usable for the DU transmission operation in downlink and a fourth available resource usable for the DU reception operation in uplink.

Specifically, in an IAB system in which a paired spectrum is supported, the network may receive a report of multiplexing capability for each of a presence or non-presence of possibility of simultaneous performance between the DU transmission operation and the MT reception operation, a presence or non-presence of possibility of simultaneous performance between the DU reception operation and the MT transmission operation, and a presence or non-presence of possibility of simultaneous performance between the DU transmission operation and the MT transmission operation, and a presence or non-presence of possibility of simultaneous performance between the DU reception operation and the MT reception operation (or transmission/reception direction combinations between MT and DU). The network may schedule the first resource configuration information and the second resource configuration information for which the simultaneous performance of the MT operation and the DU operation is supported according to the report of the multiplexing capability for at least one of transmission/reception direction combinations between the MT and the DU.

Yet, the network may schedule the first resource configuration information and the second resource configuration information for performing a preconfigured default operation when the IAB node does not report the multiplexing capability (or when the multiplexing capability for all transmission/reception direction combinations between the MT and the DU is not reported).

Specifically, as described in FIGS. 11 to 15, when failing to receive the report of the multiplexing capability, the network may schedule the first resource configuration information and the second resource configuration information for not supporting the simultaneous performance on some of the transmission/reception direction combinations between the MT and the DU but supporting the simultaneous performance on some other combinations to perform a default operation of the IAB node.

Specifically, the first resource configuration information and the second resource configuration information may include resource configuration information that supports simultaneous performance of the MT transmission operation and the DU transmission operation, that supports simultaneous performance of the MT reception operation and the DU reception operation without supporting simultaneous performance of the MT transmission operation and the DU reception operation, and that does not support simultaneous performance of the MT reception operation and the DU transmission operation. Namely, the first resource configuration information and the second resource configuration information may include configuration information for allocating or configuring the first and fourth available resources divided in a time domain, the first and third available resources divided in a frequency domain, the second and third available resources divided in the time domain, and the second and fourth available resources divided in the frequency domain.

Alternatively, the first resource configuration information and the second resource configuration information may include indication information on available resources, unavailable resources, and soft resources for which availability is not determined, as described above, for each of a downlink and an uplink. Here, the availability indication for the soft resource may be indicated through an Availability Indicator (AI) included in a DCI.

Meanwhile, as described above, the AI may be interpreted differently depending on whether FDD or TDD is supported. Specifically, when the FDD is supported, the IAB node may ignore a value equal to or greater than a preconfigured threshold value among values indicated by the AI. For example, when the AI is composed of 3 bits indicating 8 states (i.e., an existing AI in DCI format 2_5), the IAB node may ignore 4 or more of the values indicated by the AI or 3 or less of the values indicated by the AI. Alternatively, the IAB node may selectively ignore an availability for 'flexible' among availabilities corresponding to a value indicated by the existing AI.

Alternatively, the AI may be configured differently depending on whether FDD or TDD is supported. For example, when the FDD is supported, the AI may be defined as an indicator having a size of 2 bits indicating 4 states, or an indicator having a size of 1 bit indicating 2 states. On the other hand, when the TDD is supported, the AI may be defined as an indicator having a size of 3 bits indicating 8 states. Alternatively, when the FDD is supported, a DCI format including the AI may be preconfigured in a type different from the DCI format including the AI when the TDD is supported.

Communication System Example to Which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 18:
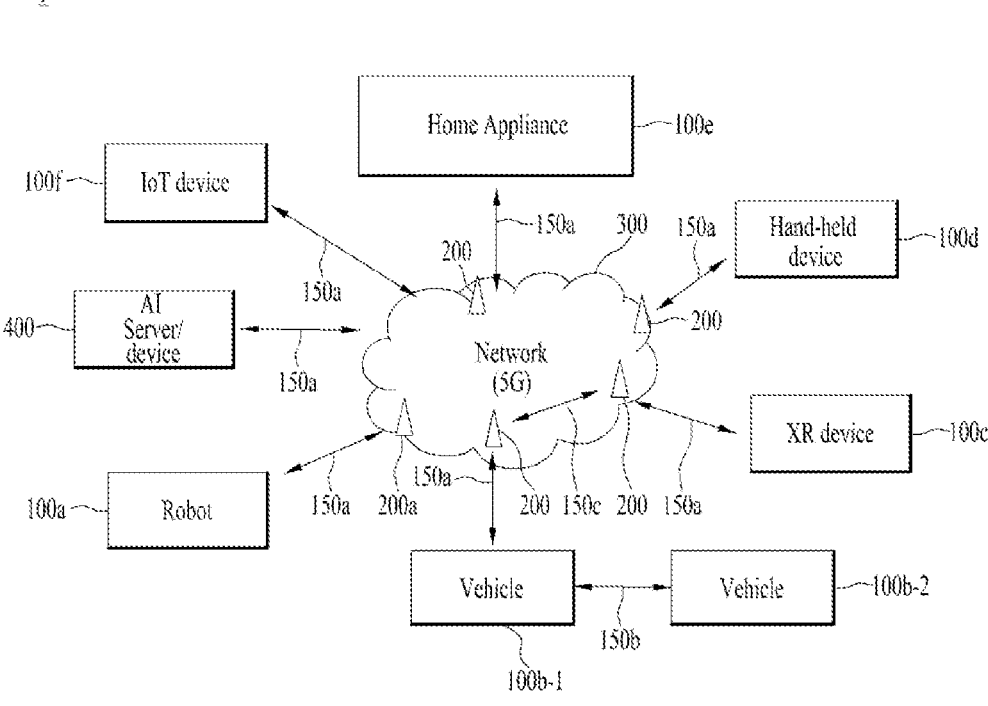
FIG. 18 illustrates a communication system applied to the present disclosure.

FIG. 18 illustrates a communication system applied to the present disclosure.

Referring to FIG. 18, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to Which the Present Disclosure is Applied

Figure 19:
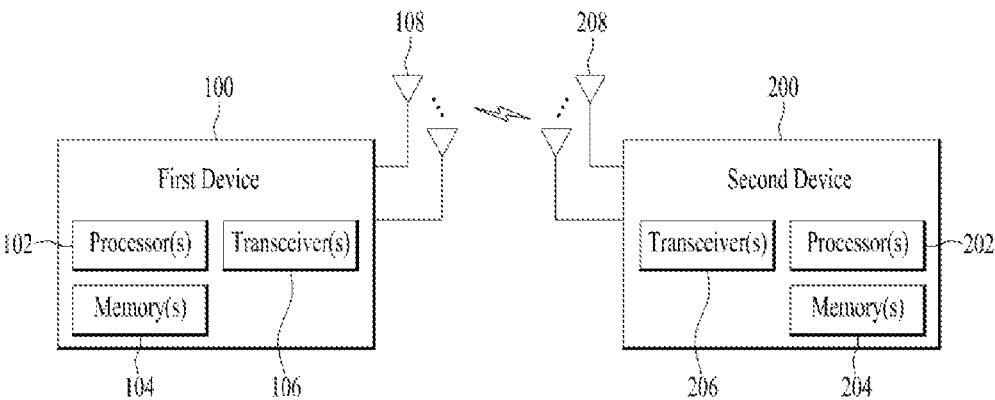
FIG. 19 illustrates wireless devices applicable to the present disclosure.

FIG. 19 illustrates a wireless device applicable to the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part ob f a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

According to one example, the first wireless device 100 may include a processor 102 connected to the RF transceiver and a memory 104. The memory 104 may include at least one program capable of performing operations related to the embodiments described with reference to FIGS. 11 to 17. Specifically, the processor 102 may control the RF transceiver 106 to receive a first resource configuration information on the MT operation and a second resource configuration information on the DU operation, perform the MT operation based on the first resource configuration information, and perform the DU operation based on the second resource configuration information. In addition, when there is no report of a multiplexing capability between the MT operation and the DU operation, the first resource configuration information and the second resource configuration information support simultaneous performance of an MT reception operation and a DU reception operation and simultaneous performance of an MT transmission operation and a DU transmission operation but do not support simultaneous performance of the MT transmission operation and the DU reception operation and simultaneous performance of the MT reception operation and the DU transmission operation. Namely, the processor 102 simultaneously performs the MT reception operation and the DU reception operation, simultaneously performs the MT transmission operation and the DU transmission operation, does not simultaneously perform the MT transmission operation and the DU reception operation, and does not simultaneously perform the MT reception operation and the DU transmission operation. In addition, the processor 102 may perform operations for the embodiments described with reference to FIGS. 11 to 17 based on the program included in the memory 104.

Alternatively, a chipset including the processor 102 and the memory 104 may be configured. In this case, a chipset includes at least one processor and at least one memory operably connected to the at least one processor and enabling the at least one processor to perform an operation when executed, the operation including receiving a first resource configuration information on the MT operation and a second resource configuration information on the DU operation, performing the MT operation based on the first resource configuration information, and performing the DU operation based on the second resource configuration information. When there is no report of a multiplexing capability between the MT operation and the DU operation, the operation simultaneous performs an MT reception operation and a DU reception operation, simultaneous performs an MT transmission operation and a DU transmission operation, does not simultaneously performs the MT transmission operation and the DU reception operation, and does not simultaneously performs the MT reception operation and the DU transmission operation. In addition, the at least one processor may perform operations for the embodiments described with reference to FIG. 11 and FIG. 17 based on a program included in the memory.

Alternatively, a computer-readable storage medium including at least one computer program enabling at least one processor to perform an operation is provided. The operation may include receiving a first resource configuration information on the MT operation and a second resource configuration information on the DU operation, performing the MT operation based on the first resource configuration information, and performing the DU operation based on the second resource configuration information. When there is no report of a multiplexing capability between the MT operation and the DU operation, the operation simultaneous performs an MT reception operation and a DU reception operation, simultaneous performs an MT transmission operation and a DU transmission operation, does not simultaneously performs the MT transmission operation and the DU reception operation, and does not simultaneously performs the MT reception operation and the DU transmission operation. In addition, the computer program may include programs capable of performing operations for the embodiments described with reference to FIG. 11 and FIG. 17.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

According to one example, the second wireless device 200 may include a processor 202 connected to the RF transceiver and a memory 204. The memory 204 may include at least one or more programs capable of performing operations related to the embodiments described with reference to FIGS. 10 to 17. Specifically, the processor 202 may control the RF transceiver 206 to schedule a first resource configuration information on an MT (mobile terminal) operation and a second resource configuration information on a DU (distributed unit) and transmit the generated first and second resource configuration informations. In addition, when there is no report of a multiplexing capability between the MT operation and the DU operation, the first resource configuration information and the second resource configuration information may support simultaneous performance of an MT reception operation and a DU reception operation and simultaneous performance of an MT transmission operation and a DU transmission operation but may not support simultaneous performance of the MT transmission operation and the DU reception operation and simultaneous performance of the MT reception operation and the DU transmission operation. In addition, the processor 202 may perform operations for the embodiments described with reference to FIGS. 10 to 17 based on the program included in the memory 204.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of wireless devices to which the present disclosure is applied

Figure 20:
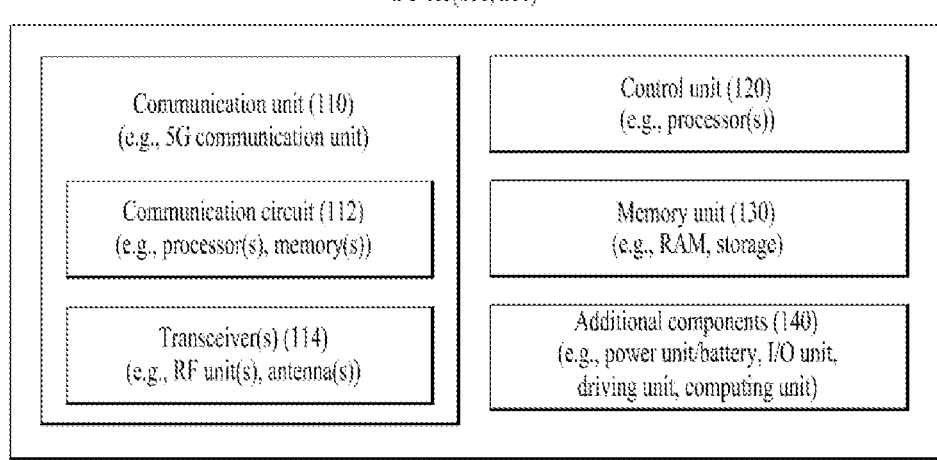
FIG. 20 illustrates another example of a wireless device to which the present disclosure is applied.

FIG. 20 illustrates another example of a wireless device applied to the present disclosure. The wireless device may be implemented in various forms according to a use-case/service (refer to FIG. 18)

Referring to FIG. 20, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/ device (400 of FIG. 18), the BSs (200 of FIG. 18), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/ low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/ reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

What is claimed is:

1. A method comprising:

receiving, by an integrated access and backhaul (IAB) node, a first resource configuration information for an IAB-mobile termination (MT) of the IAB node;

receiving, by the IAB node, a second resource configuration information for an IAB-distributed unit (DU) of the LAB node; and performing, by the IAB-MT of the IAB node, an IAB-MT reception (Rx) to receive a first downlink signal or an IAB-MT transmission (Tx) to transmit a first uplink signal based on the first resource configuration information; and performing, by the IAB-DU of the IAB node, an IAB-DU Rx to receive a second uplink signal or an IAB-DU Tx to transmit a second downlink signal based on the second resource configuration information, wherein the first resource configuration information including information for a first resource for the IAB-MT Tx and a second resource for the IAB-MT Rx, wherein the second resource configuration information including information for a third resource for the LAB-DU Tx and a fourth resource for the IAB-DU Rx, wherein the first resource is configured to be separated from the fourth resource in a time domain and the third resource in a frequency domain, and the second resource is configured to be separated from the third resource in the time domain and the fourth resource in the frequency domain, wherein a paired spectrum for a frequency division duplex (FDD) is supported for the IAB node, wherein, based on reporting of capability information for simultaneous operations of the IAB-MT and the IAB-DU, the IAB node is configured to perform at least one of (i) a simultaneous operation of the IAB-MT Tx and the IAB-DU Tx, (ii) the simultaneous operation of the IAB-MT Rx and the IAB-DU Rx, (iii) the simultaneous operation of the IAB-MT Rx and the IAB-DU Tx, or (iv) the simultaneous operation of the IAB-MT Tx and the IAB-DU Rx, and wherein, based on an absence of the reporting of the capability information, the IAB node is configured to perform at least one of (i) the simultaneous operation of the IAB-MT Tx and the IAB-DU Tx, or (ii) the simultaneous operation of the IAB-MT Rx and the IAB-DU Rx.

2. The method of claim 1, wherein the first resource configuration information is signaled by Radio Resource Control (RRC) and wherein the second resource configuration information is signaled via F1 Application Protocol (AP).

3. The method of claim 1, wherein each of the first resource configuration information and the second resource configuration information includes an indication information on an available resource, an unavailable resource, and a soft resource having availability not determined for each of a downlink and an uplink and wherein availability indication for the soft resource is indicated through an Availability Indicator (AI) included in a downlink control information.

4. The method of claim 3, wherein the IAB node ignores a value equal to or greater than a preconfigured threshold among values indicated by the AI.

5. The method of claim 3, wherein the IAB node ignores a value equal to or smaller than a preconfigured value among values indicated by the AI.

6. An integrated access and backhaul (IAB) node comprising:

a Radio Frequency (RF) transceiver; and a processor connected to the RF transceiver, the processor controlling the RF transceiver to receive a first resource configuration information for an IAB-mobile termination (MT) of the LAB, receive a second resource configuration information for an IAB-distributed unit (DU) of the LAB, perform an IAB-MT reception (Rx) to receive a first downlink signal an IAB-MT transmission (Tx) to transmit a first uplink signal using the IAB-MT of the IAB node based on the first resource configuration information, and perform an IAB-DU Rx to receive a second uplink signal and an IAB-DU Tx to transmit a second downlink signal using the IAB-DU of the IAB node based on the second resource configuration information, wherein the first resource configuration information including information for a first resource for the LAB-MT Tx and a second resource for the IAB-MT Rx, wherein the second resource configuration information including information for a third resource for the IAB-DU Tx and a fourth resource for the IAB-DU Rx, wherein the first resource is configured to be separated from the fourth resource in a time domain and the third resource in a frequency domain, and the second resource is configured to be separated from the third resource in the time domain and the fourth resource in the frequency domain, wherein a paired spectrum for a frequency division duplex (FDD) is supported for the IAB node, wherein, based on reporting of capability information for simultaneous operations of the IAB-MT and the IAB-DU, the IAB node is configured to perform at least one of (i) a simultaneous operation of the IAB-MT Tx and the IAB-DU Tx, ii) the simultaneous operation of the LAB-MT Rx and the IAB-DU Rx, (iii) the simultaneous operation of the IAB-MT Rx and the IAB-DU Tx, and the IAB-MT Tx or (iv) the simultaneous operation of the IAB-DU Rx, the IAB node is allowed to perform all of the simultaneous operations, and wherein, based on an absence of the reporting of the capability information, the IAB node is configured to perform at least one of (i) the simultaneous operation of the IAB-MT Tx and the IAB-DU Tx, or the simultaneous operation of the IAB-MT Rx and the IAB-DU Rx.

7. At least one non-transitory computer-readable storage medium storing instructions that, when executed by at least one processor, cause the processor to perform operations comprising:

receiving a first resource configuration information for an integrated access and backhaul (IAB)-mobile termination (MT) of a IAB node;

receiving a second resource configuration information for an IAB-distributed unit (DU) of the IAB node; and performing an IAB-MT reception (Rx) to receive a first downlink signal or an IAB-MT transmission (Tx) to transmit a first uplink signal using the IAB-MT of the IAB node based on the first resource configuration information; and performing an IAB-DU Rx to receive a second uplink signal or an IAB-DU Tx to transmit a second downlink signal using the IAB-DU of the IAB node based on the second resource configuration information, wherein the first resource configuration information including information for a first resource for the IAB-MT Tx and a second resource for the IAB-MT Rx, wherein the second resource configuration information including information for a third resource for the IAB-DU Tx and a fourth resource for the IAB-DU Rx, wherein the first resource is configured to be separated from the fourth resource in a time domain and the third resource in a frequency domain, and the second resource is configured to be separated from the third resource in the time domain and the fourth resource in the frequency domain, wherein a paired spectrum for a frequency division duplex (FDD) is supported for the IAB node, wherein, based on reporting of capability information for simultaneous operations of the IAB-MT and the IAB-DU, an IAB node including the IAB-MT and the IAB-DU is configured to perform at least one of (i) a simultaneous operation of the IAB-MT Tx and the IAB-DU Tx, (ii) the simultaneous operation of the IAB-MT Rx and the IAB-DU Rx, (iii) the simultaneous operation of the IAB-MT Rx and the IAB-DU Tx, or (iv) the simultaneous operation of the IAB-MT Tx and the IAB-DU Rx, and wherein, based on an absence of the reporting of the capability information, the IAB node is configured to perform at least one of (i) the simultaneous operation of the IAB-MT Tx and the IAB-DU Tx, or (ii) the simultaneous operation of the IAB-MT Rx and the IAB-DU Rx.

\*    \*    \*    \*    \*